United States Patent [19]
Hauk et al.

[11] 3,975,945
[45] Aug. 24, 1976

[54] APPARATUS FOR TESTING PIPE FOR LEAKS

[75] Inventors: Thomas D. Hauk; Kenneth J. Carstensen, both of Huntington Beach, Calif.

[73] Assignee: Service Equipment Design Co., Inc., Signal Hill, Calif.

[22] Filed: June 30, 1975

[21] Appl. No.: 591,502

[52] U.S. Cl. .................................. 73/46; 73/49.1; 73/49.5
[51] Int. Cl.² ...................... G01M 3/28; F17D 3/04
[58] Field of Search ................. 73/46, 40.5 R, 49.1, 73/49.5, 49.8; 138/99; 285/18

[56] References Cited
UNITED STATES PATENTS

| | | | |
|---|---|---|---|
| 3,371,521 | 3/1968 | Hauk | 73/46 |
| 3,737,180 | 6/1973 | Hayes, Jr. et al. | 138/99 X |
| 3,744,822 | 7/1973 | Arnold | 285/18 |
| 3,759,551 | 9/1973 | Broske | 285/18 |
| 3,921,437 | 11/1975 | Hauk | 73/40.5 R |

*Primary Examiner*—Richard C. Queisser
*Assistant Examiner*—Joseph W. Roskos
*Attorney, Agent, or Firm*—Richard L. Gausewitz

[57] ABSTRACT

The casing of an external leak tester for joints in oil well pipes is greatly reinforced in a compact manner by a cage which is symmetrical about two planes oriented at right angles to each other — each plane containing the axis of the pipe to be tested. Four parallel pins interconnect the components of the cage, and one such pin (a lock pin) is retractable by piston means in order to permit the cage and thus the casing to open wide for lateral reception of the pipe. A plurality of means are provided to effect precise and rapid alignment of apertures in the cage, in order that the piston-operated lock pin may be inserted without binding to thereby lock the cage in closed condition. Cylinder-operated hooks are provided to effect augmented sealing compression of the sealing means for the test chamber, and to close the cage to the position at which the lock pin may be inserted as indicated above. Cylinder means are provided to pivot to a wide-open position certain components of the cage which interconnect with the lock pin, thus greatly facilitating entry of the pipe into the apparatus.

30 Claims, 22 Drawing Figures

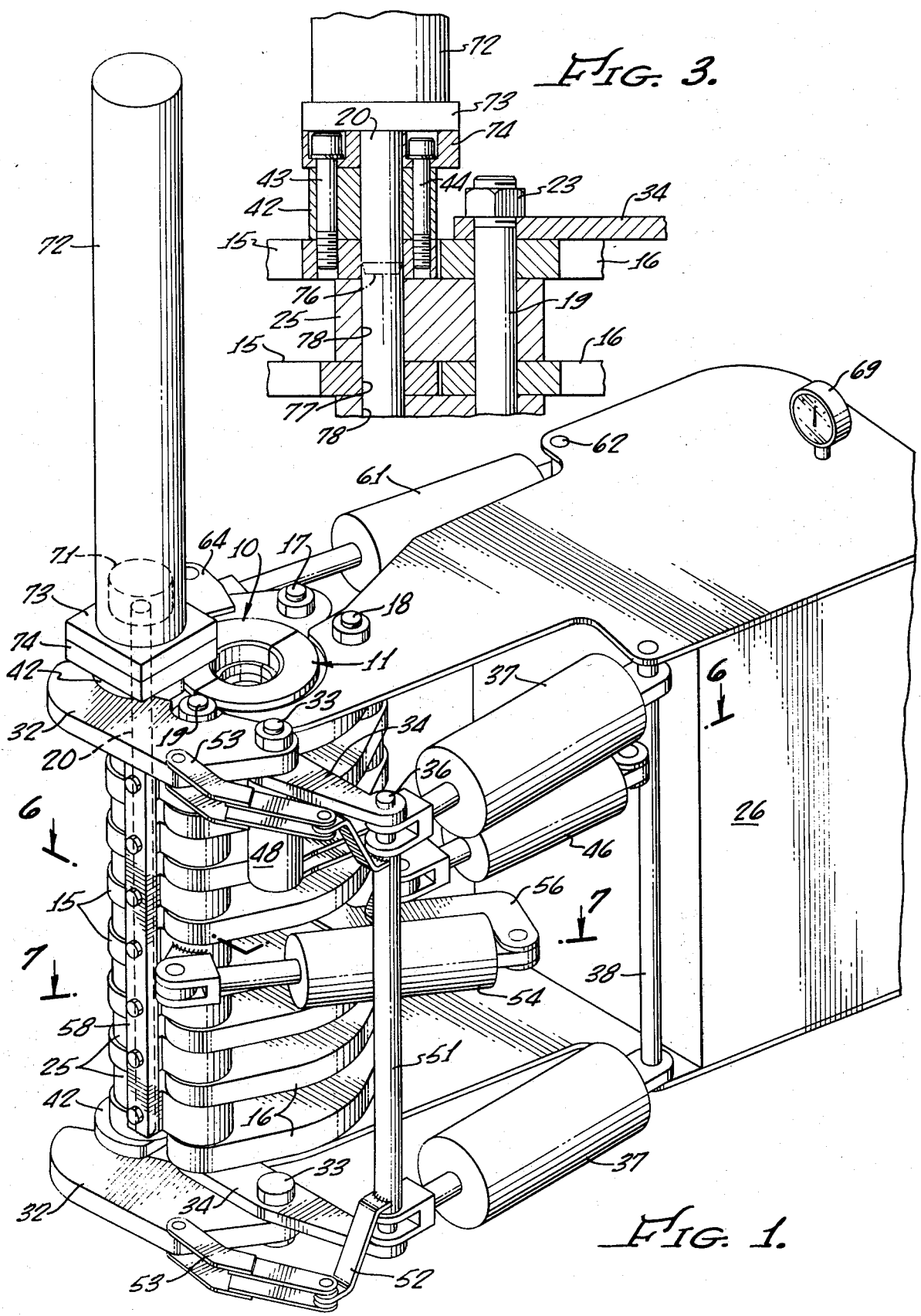

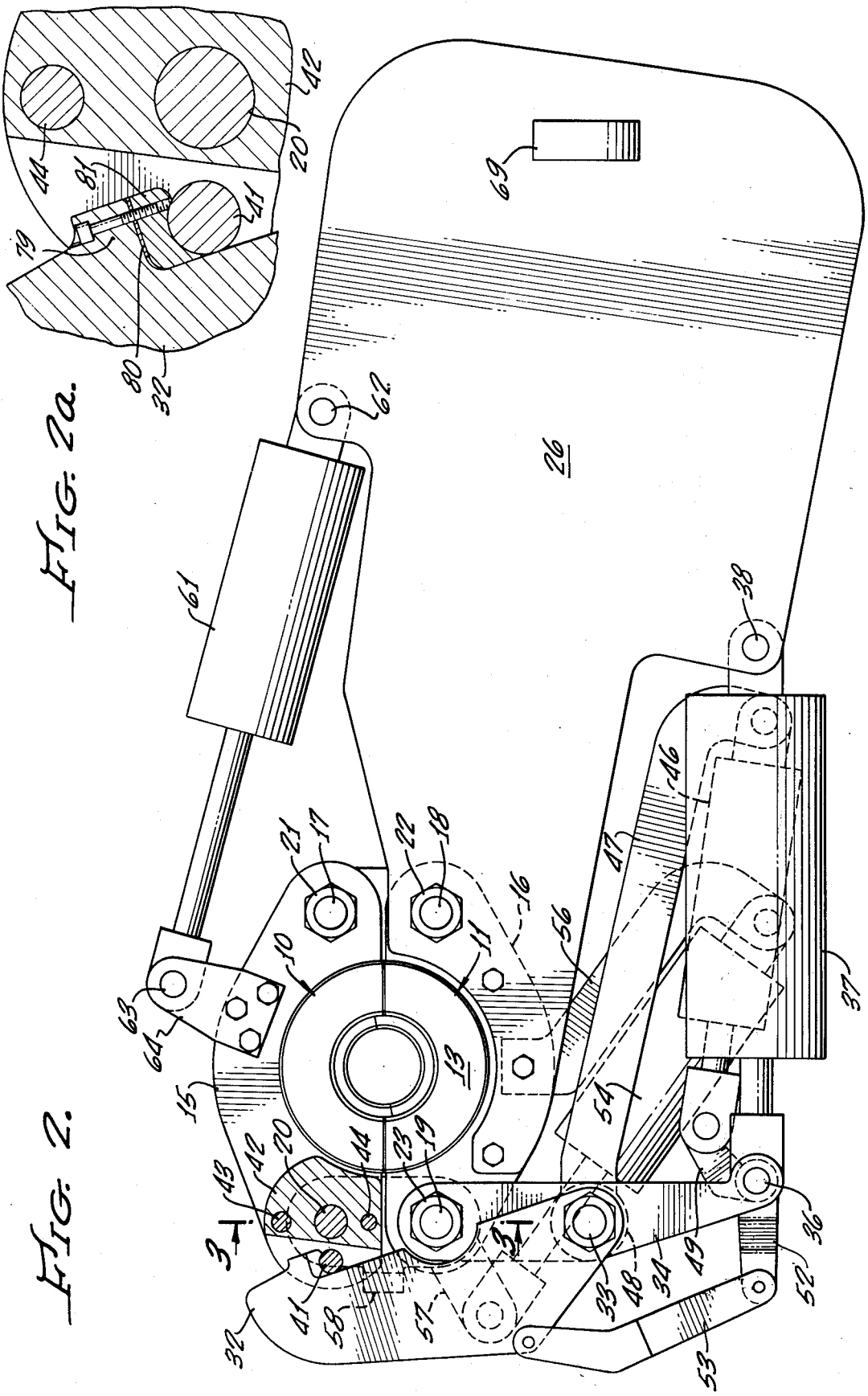

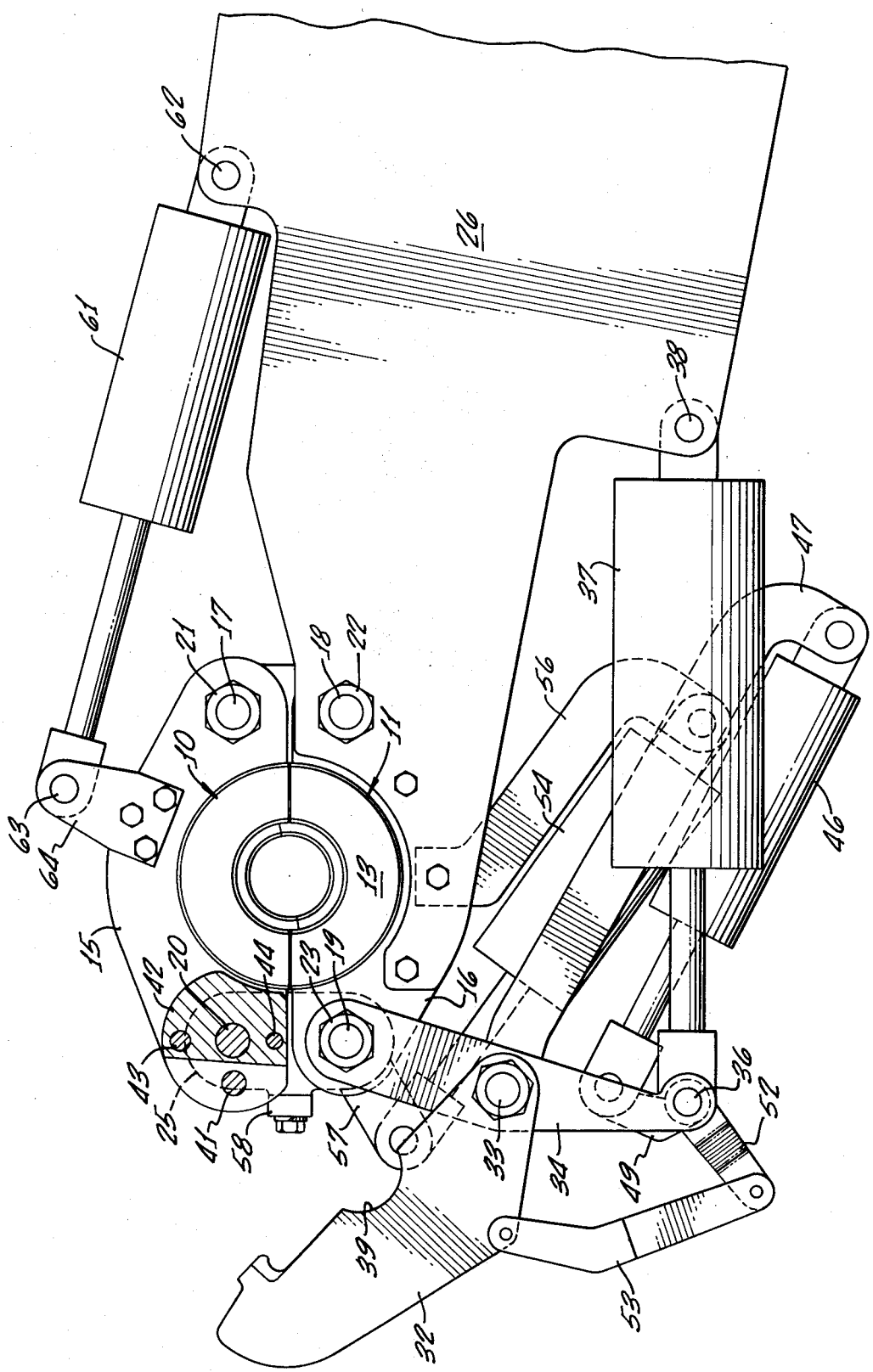

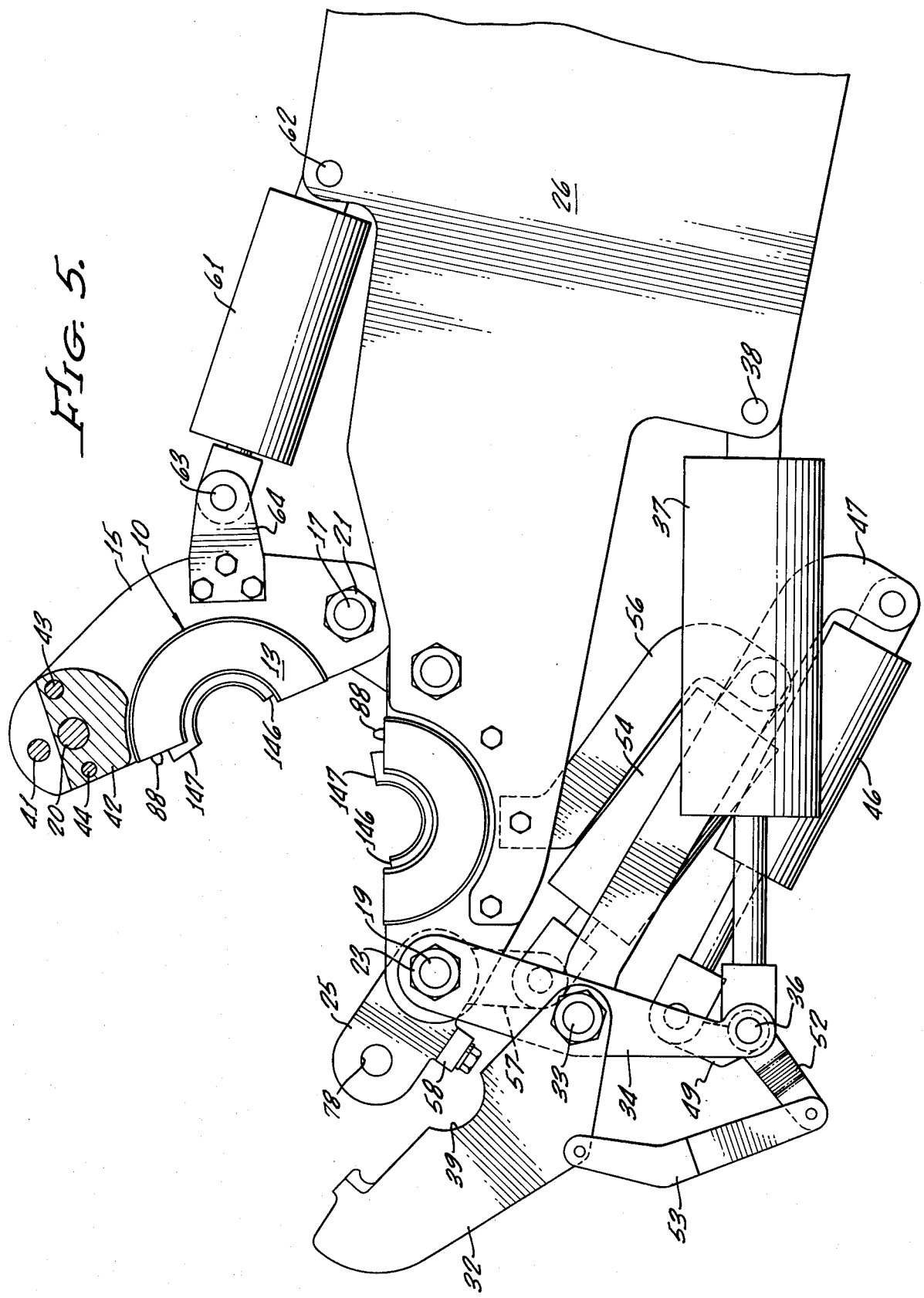

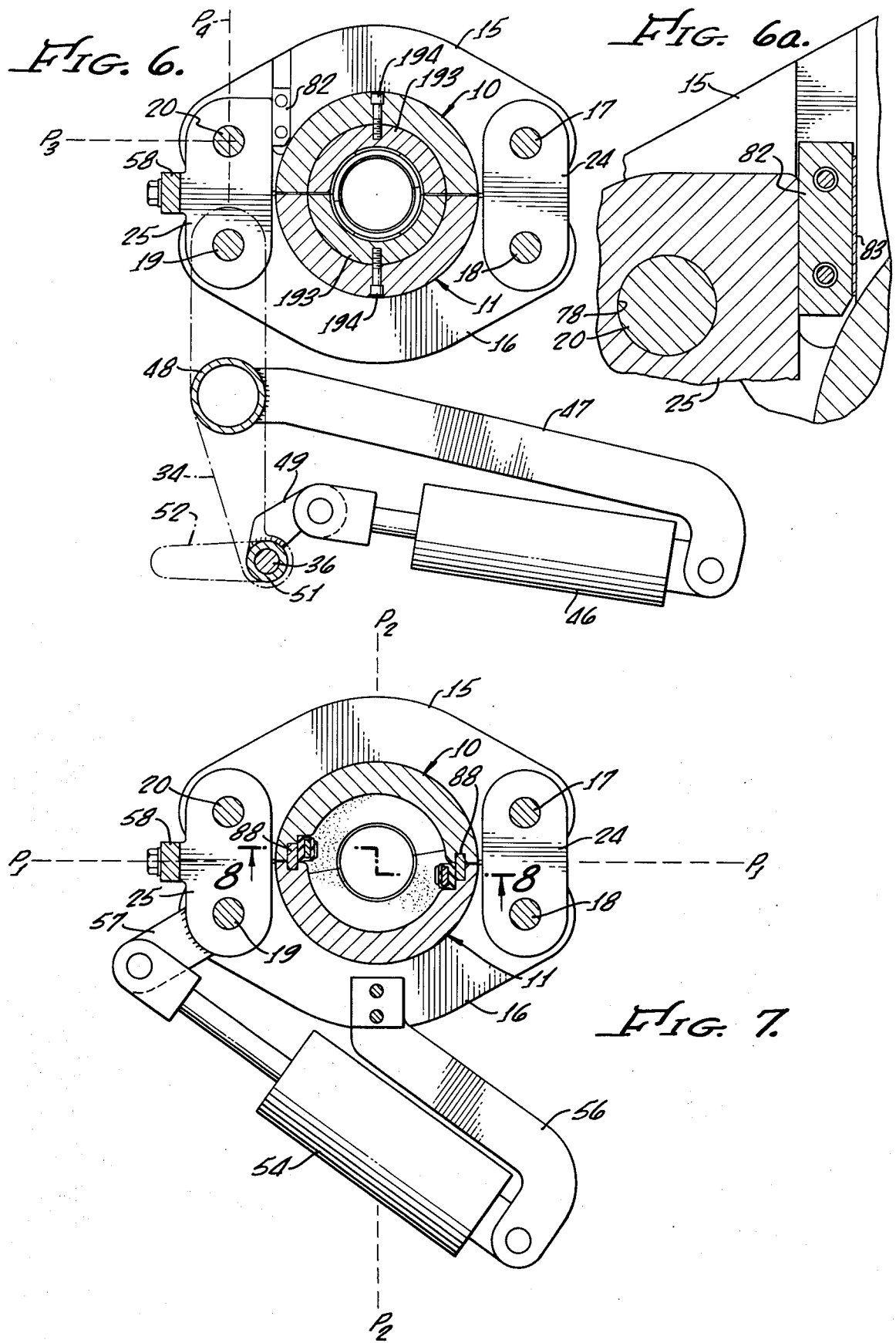

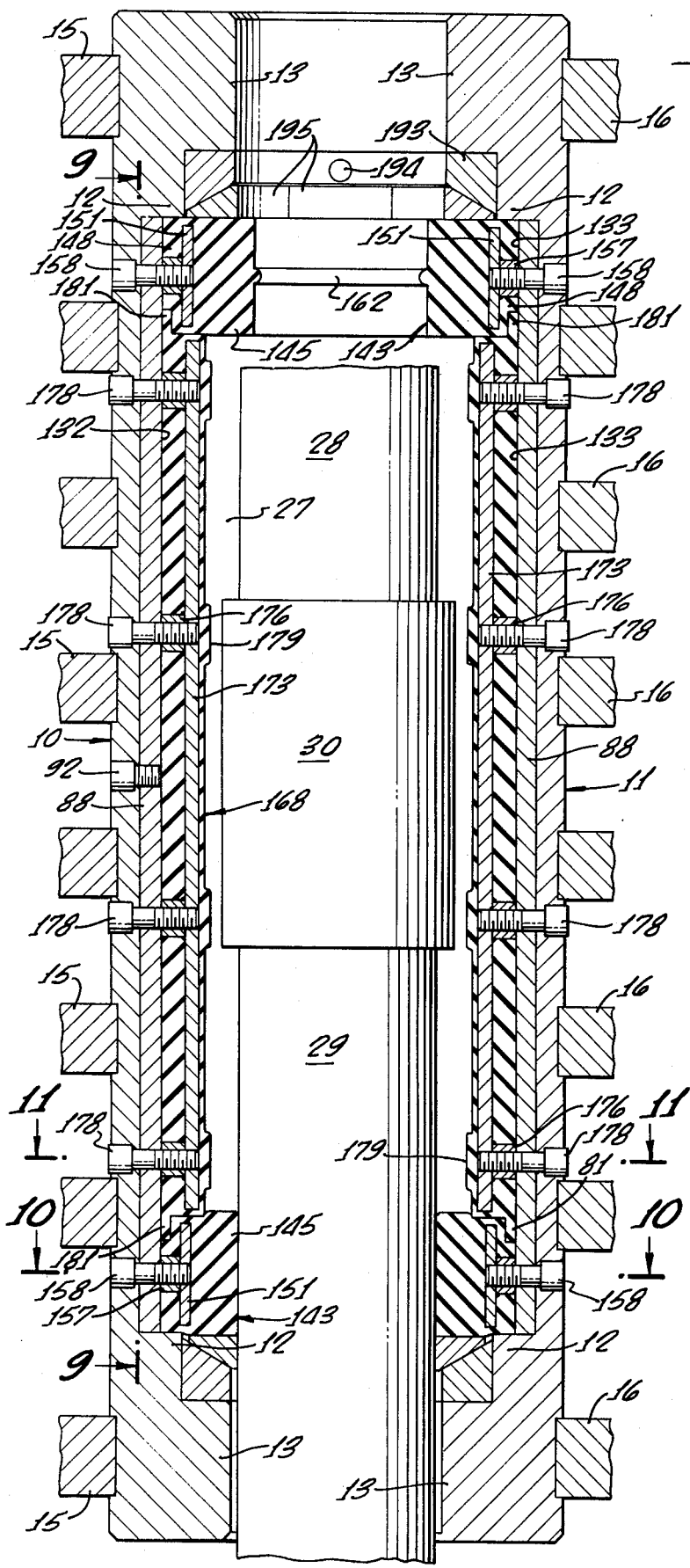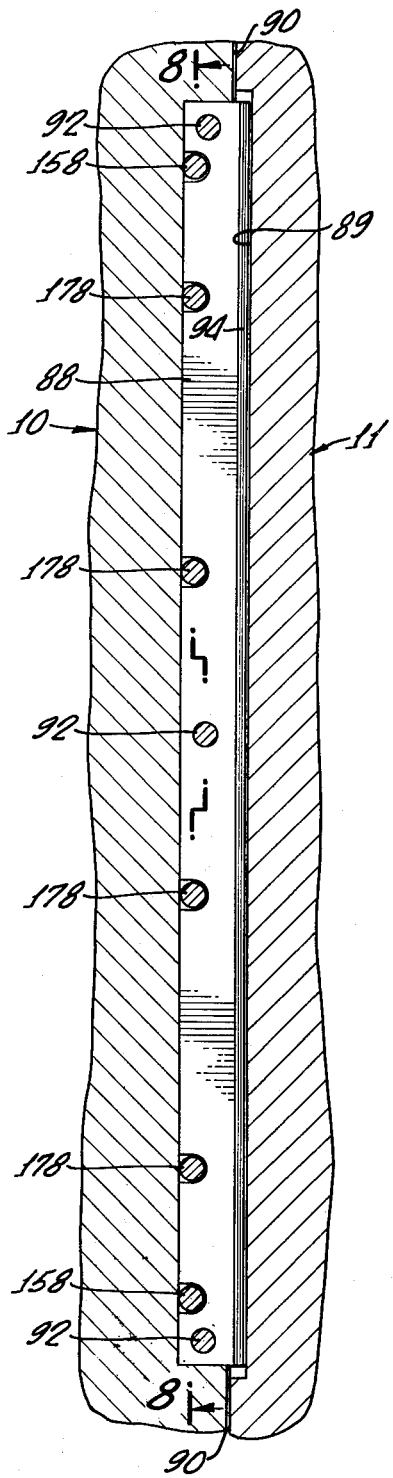

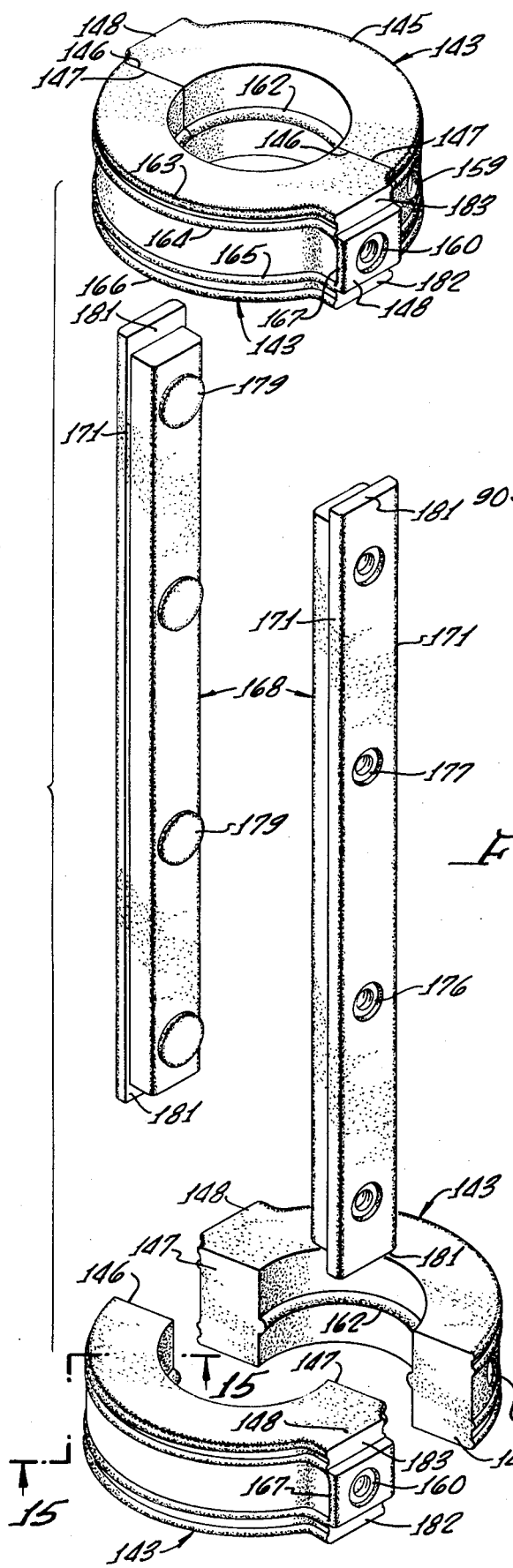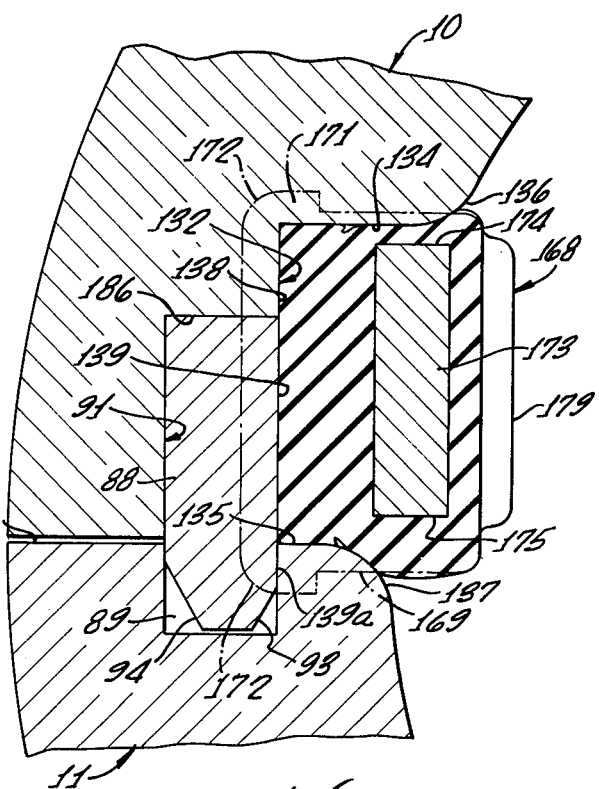
Fig. 13.
Fig. 12.
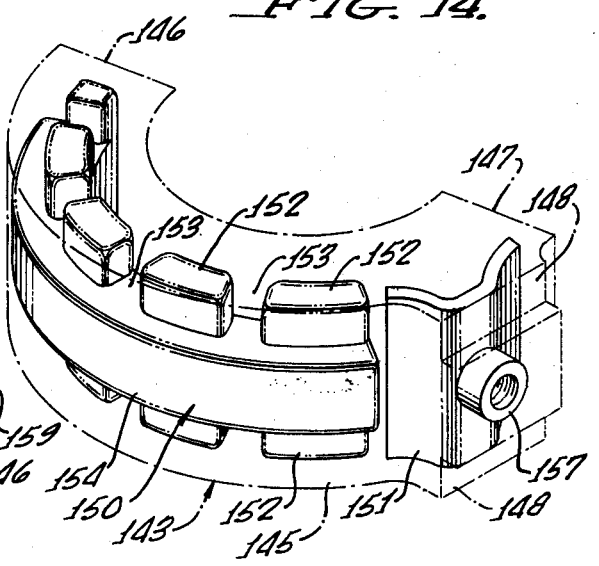
Fig. 14.

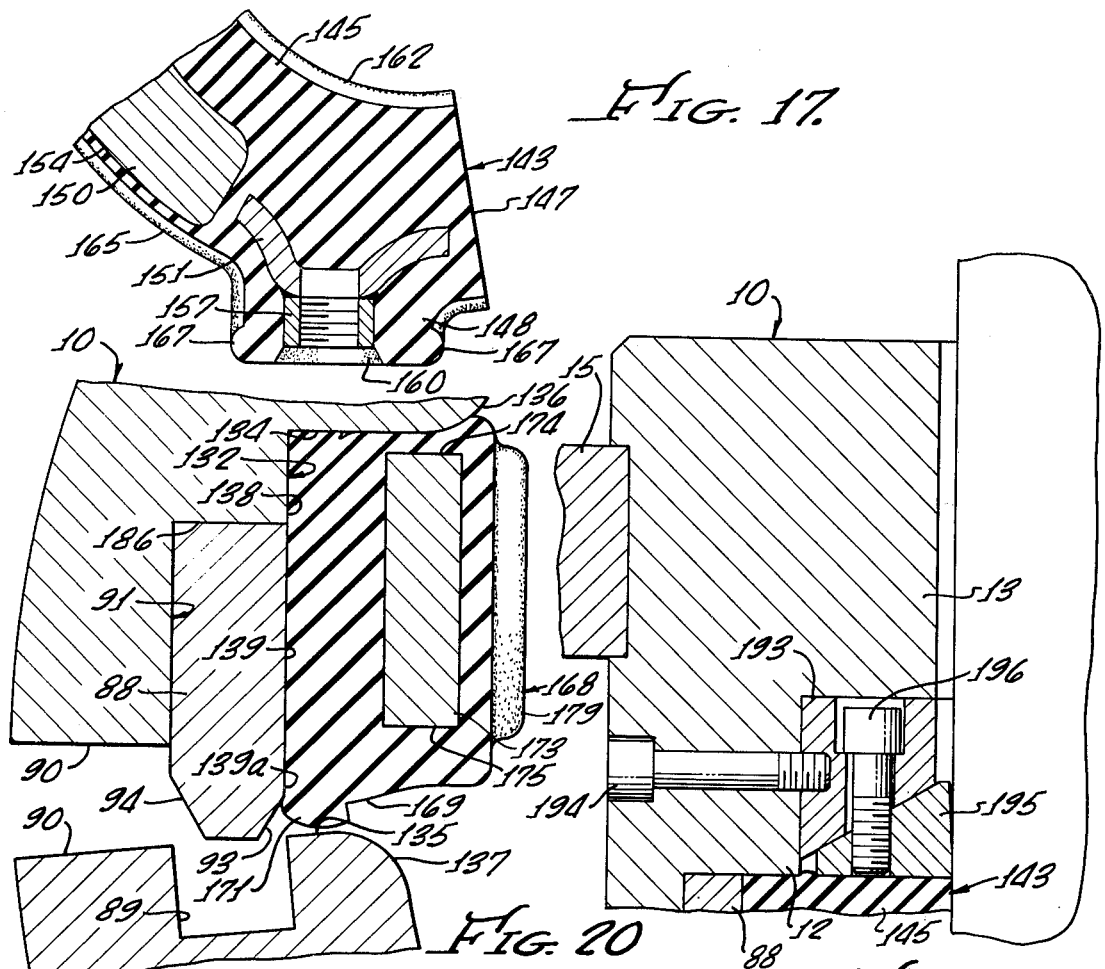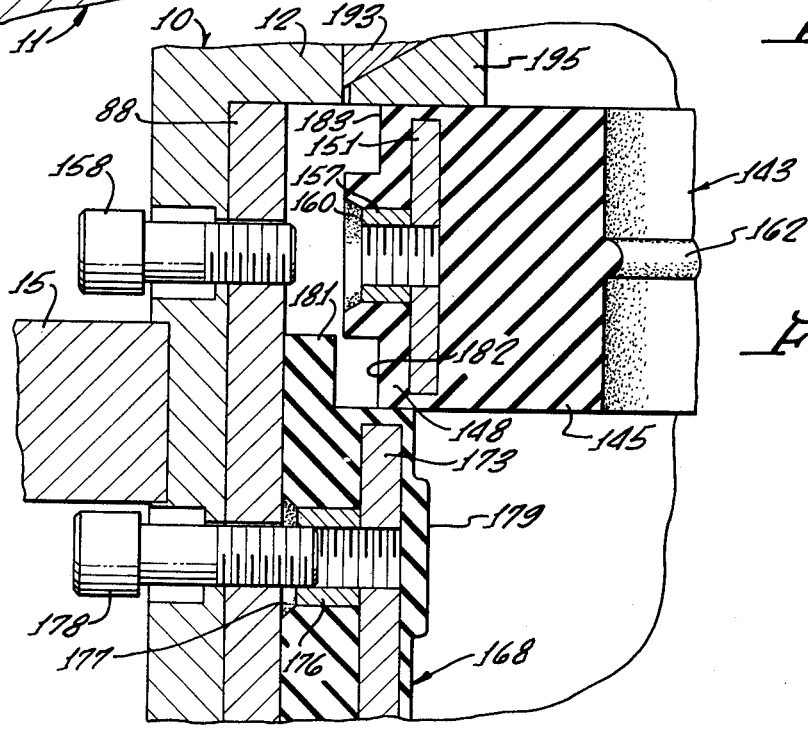

APPARATUS FOR TESTING PIPE FOR LEAKS

BACKGROUND OF THE INVENTION

1. Field of the Invention

The invention relates to the field of apparatus for effecting high-pressure external testing of pipe joints for leakage, which apparatus is quickly openable and closable in order that the pipes may be laterally introduced and withdrawn from the test apparatus.

2. Description of Prior Art

In prior-art U.S. Pat. No. 3,371,521 there is shown an external leak tester in which cylinder-operated hooks constitute the sole means for maintaining the casing closed. Such hook-type locking means is relatively weak in comparison to the locking means of the present apparatus, thus limiting the pressure-containing capability of the prior-art apparatus when it is so constructed as to have reasonable size and weight.

U.S. Pat. No. 3,744,822 does not relate to a leak tester. It discloses a cylinder-operated lock pin which extends through eyes interrelated in the manner of a piano hinge. The apparatus of such patent does not incorporate a cage, and has only two pins, some results of such construction being (a) that the apparatus must be extremely heavy if very high pressures are to be contained, and (b) that the apparatus may not be opened wide by means of a reasonable-size cylinder having a reasonable stroke. Very importantly, U.S. Pat. No. 3,744,822 does not disclose any means, other than the casing itself and the hinge pin therefor, for effecting alignment of the holes through which the lock pin is introduced.

SUMMARY OF THE INVENTION

The present external tester for determining the presence or absence of leaks in pipe joints has a cage which is symmetrical about two planes oriented at right angles to each other and intersecting at the axis of the apparatus. There are no relatively weak portions of the overall cage, which means that extremely high fluid pressures may be contained by an apparatus of reasonable size and weight.

The cage incorporates a plurality of pins, preferably four, one such pin being retractable by cylinder means to thus perform the locking and unlocking functions. In addition to such retractable pin, the apparatus incorporates hook means for closing the cage and the associated casing and for effecting augmented sealing compression of the rubber in the sealing means contained therein.

Means are provided to pivot to a wide-open position a set of lock bars incorporated in the cage, and thereafter to close such lock bars to a predetermined closed position achieving alignment of the holes through which the lock pin is introduced. Such predetermined position is determined by stop means, which stop means cooperate with the hooks, and with the rubber in the sealing means, for precisely positioning all of the lock-pin holes in registered relationship. Additional important means for properly registering the holes are bar means which also form part of the sealing means for the casing.

In summary, therefore, the present apparatus employs hooks to effect final closing of the casing and to achieve augmented compression of the seal means, but such hooks form no substantial part of the means for maintaining the casing closed under test pressure — the last-mentioned means being the lock pin which is introduced through the registered holes in the cage. Because of this relationship, because of the symmetrical cage relationship, and because of the presence of accurate and adjustable means for effecting precise alignment of the holes, the present apparatus is fast acting, strong, compact and relatively lightweight in comparison to the pressures which may be contained therein. The symmetrical cage and casing construction simplifies manufacture, permits wide opening of the apparatus by cylinders of reasonable stroke, and causes the stresses in the casing halves to be uniformly distributed.

The hooks of the present apparatus are not in over-center positions when closed, which increases the safety of the apparatus for reasons stated below.

BRIEF DESCRIPTION OF THE DRAWINGS

FIG. 1 is an isometric view showing the present leak-testing apparatus in closed condition but with no pipe contained therein;

FIG. 2 is a top plan view of the showing of FIG. 1, the locking cylinder being broken away;

FIG. 2a is an enlarged fragmentary view showing the upper-left region of FIG. 2 and, in particular, showing the relationship between an index pin and the associated hook and shim elements;

FIG. 3 is a fragmentary vertical sectional view taken on line 3—3 of FIG. 2, and illustrating the locking pin in fully retracted condition;

FIG. 4 is a top plan view corresponding to FIG. 2 but showing the conditions of the parts after the hooks have been shifted away from the index pins;

FIG. 5 is a view corresponding to FIGS. 2 and 4 but showing the apparatus in fully open condition;

FIG. 6 is a horizontal sectional view on line 6—6 of FIG. 1, illustrating the apparatus for pivoting the hooks to full-open conditions (the hooks being unshown);

FIG. 6a is an enlarged view of the upper-left region of FIG. 6, showing stop and shim means for the lock bars;

FIG. 7 is a horizontal sectional view on line 7—7 of FIG. 1, illustrating the apparatus for opening and closing the lock bars;

FIG. 8 is a vertical section on the broken line 8—8 of FIG. 7, illustrating the seal means, the showing at the bottom of FIG. 8 being after the apparatus is clamped on a pipe to be tested, the showing at the top of FIG. 8 being prior to the time the apparatus is clamped on the pipe to be tested;

FIG. 9 is a fragmentary vertical sectional view on line 9—9 of FIG. 8, showing one of the index and extrusion-prevention bars;

FIG. 12 is an isometric view showing the various seal elements in the conditions assumed thereby prior to application of any compression;

FIG. 13 is an enlarged horizontal fragmentary sectional view corresponding somewhat to the left-central region of FIG. 11, but taken at a different elevation where there is no screw, there being shown in phantom lines the cross-sectional shape of the rubber in the sealing strip prior to application of any compression;

FIG. 14 is an isometric view showing one of the arcuate seal segments in phantom lines, and showing in solid lines the inserts contained in such one arcuate seal segment;

FIG. 17 is a fragmentary sectional view showing the beads on one of the arcuate sealing segments;

FIG. 18 is a vertical sectional view illustrating the means for preventing longitudinal extrusion of the arcuate seal segments;

FIG. 19 is a fragmentary vertical sectional view illustrating in enlarged form the seal regions at the upper-left portion of FIG. 8, but prior to application of any mounting or sealing compression; and FIG. 20 is a view showing a portion of FIG. 13, but when the casing is not closed but instead in the process of closing.

BRIEF DESCRIPTION OF THE PREFERRED EMBODIMENT

DEFINITIONS

Figure 10:
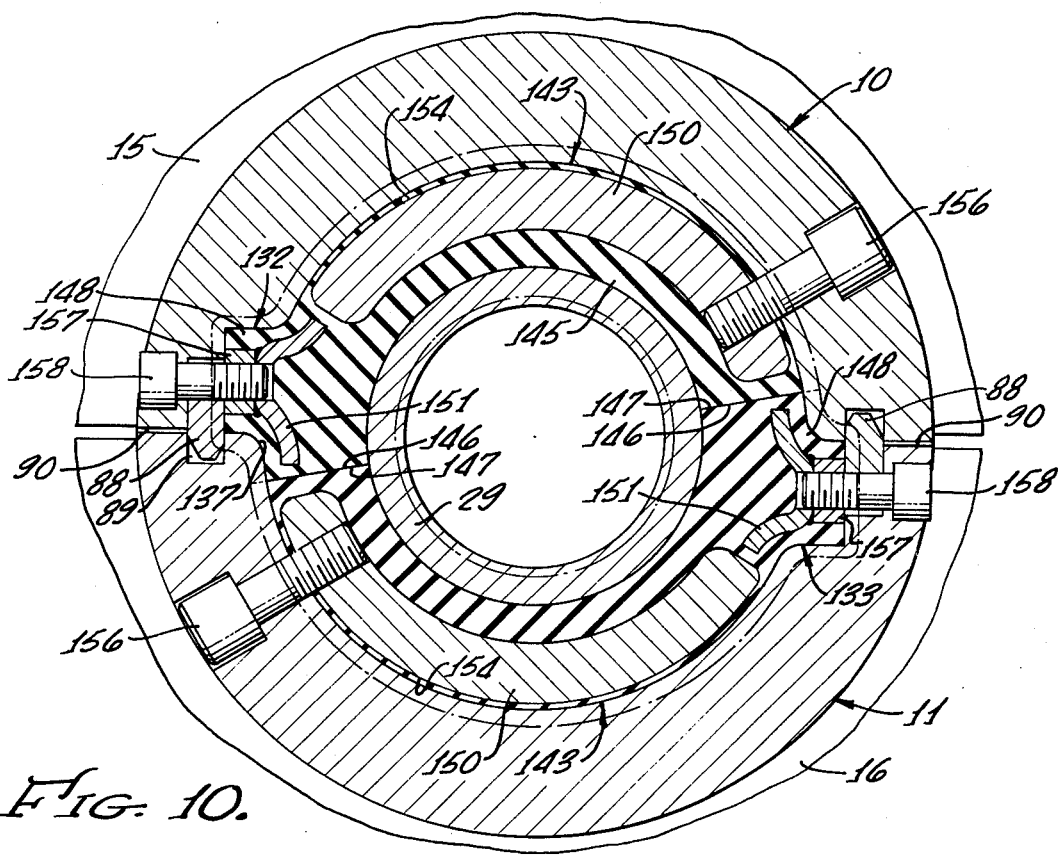
FIG. 10 and FIG. 11 are horizontal sectional views taken, respectively, on lines 10—10 and 11—11 of FIG. 8, there being shown in phantom lines in FIG. 10 the shape of the sealing rubber prior to application of any compression.

The word "cylinder" denotes a piston and double-acting cylinder assembly with associated lines, valve, etc.

The word "rubber" denotes any natural or synthetic rubber, or other elastomeric (or plastic) material having the general characteristics of rubber.

The "initial sealing compression" is that amount of compression which is present in the mounted seal elements when the casing is open. The "augmented sealing compression" is that degree of compression which is present in the sealing elements when the casing is fully closed. The "final sealing compression" is that amount of sealing compression present in the sealing elements when there is maximum fluid pressure in the test chamber.

DETAILED DESCRIPTION OF THE PRESENT APPARATUS, OTHER THAN THE SEAL MEANS

Referring to the drawings, for example to FIG. 7 and 8, the apparatus comprises two semi-cylindrical casing sections 10 and 11 the upper and lower ends of which are doubly neckeddown as indicated at 12 and 13 in FIG. 8. The casing is greatly and uniformly strengthened and reinforced by a symmetrical cage formed of opposed ribs which are respectively welded to casing sections 10 and 11, and also formed of opposed bars which extend between pins through the ribs.

Stated more specifically, one set of parallel ribs is numbered 15 and is welded externally to casing section 10 at substantially uniformly spaced points therealong and preferably in shallow grooves therein. The second set of parallel ribs is numbered 16, being welded to casing section 11 and being the mirror image of ribs 15. Extended through the ends of ribs 15-16 are four pins 17-20. Three of such pins, numbers 17-19, are permanently fixed in position as by nuts 21-23 (FIG. 2) at their ends. The fourth pin, number 20, is a retractable lock pin which is cylinder operated as described subsequently.

Figure 16:
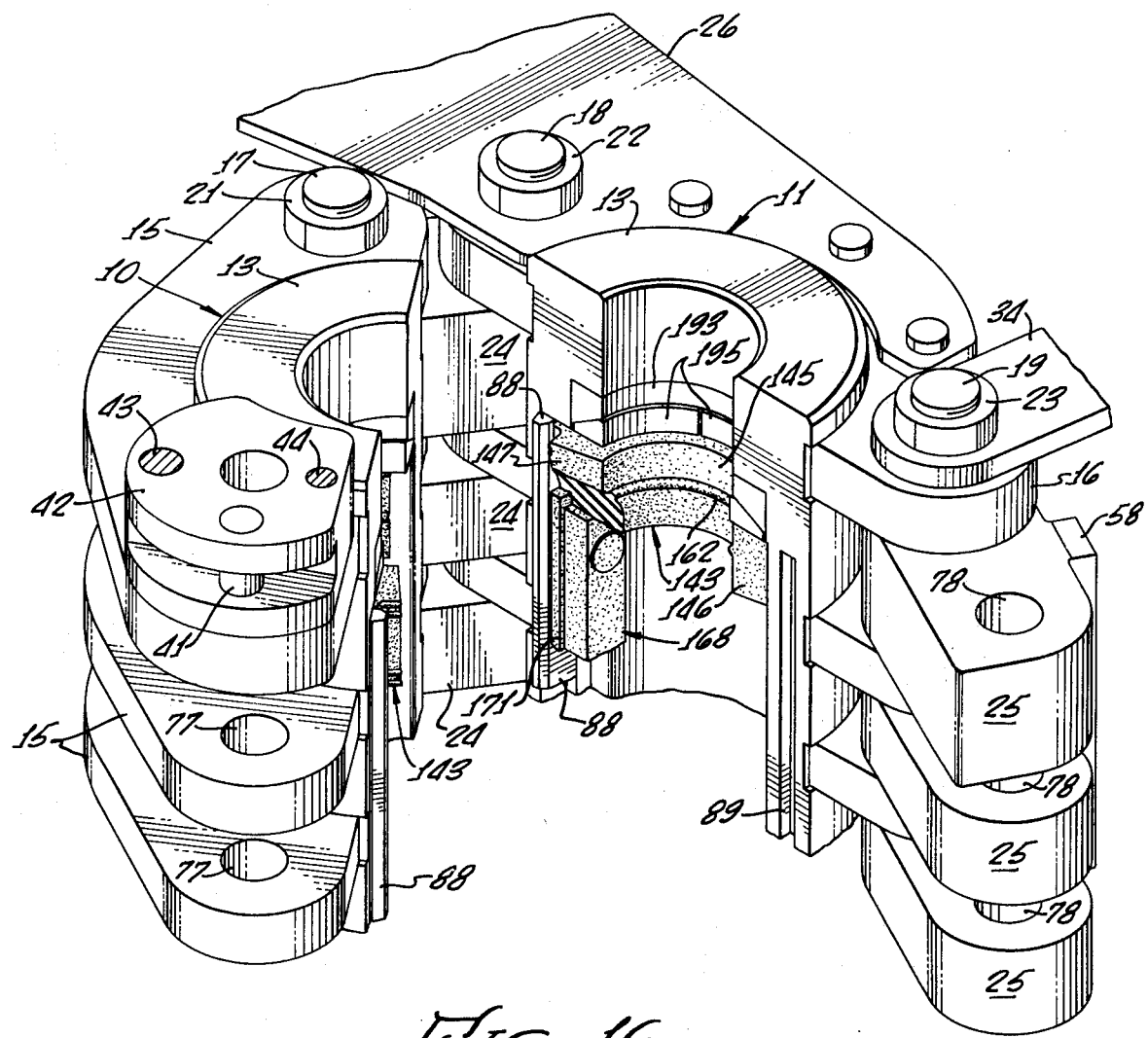
FIG. 16 is an isometric view showing the upper region of the leak tester in open condition, the lock cylinder being omitted.

The opposed pins 17 and 18 at the rear of the cage (the "rear" being the portion opposite the part which opens to receive a section of pipe to be tested) are connected by hinge bars 24 (FIGS. 6–7 and 16). The pins 19 and 20 at the front of the cage are connected by lock bars 25 which are pivotable as stated below. The hinge bars 24 and lock bars 25 are sufficiently thick to fill in the spaces between the adjacent ones of ribs 15 and 16, the result being that all of the pins 17-20 are in total shear and are not subjected to bending stresses.

The described cage is symmetrical about two planes which are perpendicular to each other and which intersect at the axis of the apparatus. Such planes are shown at $P_1$ and $P_2$ in FIG. 7. Because of such symmetry, the two ribs 15 and 16 shown in FIG. 7 are directly opposite each other and lie in the same plane which is perpendicular to the axis of the apparatus. Similarly, the two bars 24 and 25 shown in FIG. 7 are directly opposite each other and are in the same plane perpendicular to the axis of the apparatus.

The word "symmetry" as employed in the present specification and claims denotes not only those situations (such as the present one) wherein the ribs and bars are substantially identically shaped, but also those situations wherein the ribs and bars are differently shaped. Thus, for example, if the lock bar 25 shown in FIG. 7 were twice as wide as is shown in such figure, with hinge bar 24 remaining the same shape as is shown in such figure, there would still be symmetry about plane $P_2$ as the word "symmetry" is employed in this specification and claims.

The described cage, etc., are connected to a suitable valve housing indicated at 26 in FIG. 1, and are suitably suspended by means (not shown) at the wellhead of an oil well. The upper and lower walls of the valve housing 26 extend forwardly and are bolted, respectively, above the uppermost one of ribs 16 and below the lowermost one of such ribs.

In order that the casing formed by elements 10–11 and associated parts may define a sealed chamber (the "test chamber") around a section of pipe, seal means are provided within the casing as described below under the subheading "Description of the Seal Means." Referring, for example, to FIG. 8, the apparatus is particularly adapted to define an annular test chamber 27 around a pipe section formed by two pipe elements 28 and 29 which are connected by a threaded collar 30. Such pipe may be drill pipe, casing pipe, etc. As described under such subheading, the seal means is primarily rubber and includes protruding portions which are compressed (to form the "augmented sealing compression") in response to closing of the casing as described below. Thus, closing of the casing requires a very substantial amount of force in order to overcome the resistance provided by the rubber and to create the stated augmented sealing compression.

DESCRIPTION OF THE HOOK MEANS FOR CLOSING THE CASING AND CREATING AUGMENTED SEALING COMPRESSION IN THE SEAL MEANS FOR TEST CHAMBER 27:

The means for closing the casing and creating the augmented sealing compression comprise hooks 32 one of which is mounted near the top of the casing and one of which is mounted near the bottom thereof. Such hooks need not be nearly as strong as in the prior art, since they need not withstand the extreme loads created by pressure in chamber 27 during the test operation. Each hook 32 is pivotally connected by a short pin 33 to a lever 34, as best shown at the bottom of FIG. 1, one end of such lever 34 being pivoted to the pin 19 for lock bars 25 (FIG. 3). The other end of each lever 34, remote from pin 19, is pivoted to a pin 36 and thus to an actuating cylinder 37. Each cylinder 37 is, in turn, pivotally connected to a pin 38 which is fixed between the upper and lower walls of valve housing 26.

An intermediate edge portion of each hook 32 is recessed at 39 (FIG. 4) in order to provide clearance relative to the nut 23 on pin 19. Thus, the hooks do not pivot about pin 19 but instead about the pins 33 supported by levers 34.

Hooks 32 and the associated levers 34 form compound lever systems which, when cylinders 37 are shortened, cause the hooks to move downwardly (as viewed in FIG. 2), thus fully closing the casing and its associated cage, and creating the requisite augmented sealing compression in the seal means. The hook members hook around index and closing pins 41 shown in FIGS. 2 and 16, which pins are provided in grooved blocks 42 mounted by bolts 43 and 44 on the uppermost and lowermost ribs 15.

Contrary to prior-art apparatus wherein the lever systems are such that the hooks move over center, the present systems formed by hooks 32 and levers 34 preferably do not move over center. Thus, and referring to FIG. 2 which shows the apparatus fully closed, it is pointed out that a straight line extending from the axis of index pin 41 to the axis of pin 33 is on the side of the axis of pin 19 remote from casing elements 10-11. This is a very desirable feature since it means that, in the event of malfunction of the pin 20 which locks the cage (and thus the casing) in closed condition during the test procedure, there will still be no dangerous breakage of any portions of the hooks 32. Instead, a buildup of pressure in test chamber 27 will eventually (and previous to the time an excessive pressure is reached) operate to cam open the apparatus by causing the pins 41 to cam away from the hooks 32. The casing then opens, together with its associated seal means, and releases the test pressure before any damage is done. If, on the other hand, the hooks pivoted over center, the center being the axis of pin 19, then a malfunction of the lock pin 20 (causing it to remain in unlocking position) would not permit the pressure to cam open the casing but would instead result in hook breakage and consequent danger due to flying metal.

It is emphasized that pins 41 are close to lock pin 20, which enhances the cooperation between these elements.

When the hooks 32 are in positions such that they do not bear against their associated pins 41, the hooks may be pivoted to the wide open positions shown in FIGS. 4 and 5 due to operation of a cylinder 46 best shown in FIGS. 1 and 6. One end of cylinder 46 is pivoted to a bracket 47 which is welded to a tube 48. Tube 48 is, in turn, welded to the underside of the top lever 34.

The other end of cylinder 46 is connected to a crank 49 on a sleeve 51 which is rotatably mounted on pin 36. Welded to the upper and lower ends of sleeve 51 are additional cranks 52 which pivotally connect through links 53 to central-outer regions of hooks 32.

DESCRIPTION OF THE MEANS FOR PIVOTING LOCK BARS 25 TO OPEN POSITIONS

In order to cause pivotal movement of lock bars 25 to the wide-open positions shown in FIG. 5, thus greatly facilitating lateral introduction of the pipe 28-30 (FIG. 8) into the test chamber 27, an additional cylinder 54 is provided as best shown in FIG. 7. One end of cylinder 54 is pivotally connected to bracket 56 which, in turn, is bolted to one of ribs 16. The other end of cylinder 54 is connected to a crank 57 which is mounted on one of the lock bars 25. Such one lock bar 25 is, in turn, connected to all of the other lock bars by means of a vertical connector bar 58. Bar 58 is held in place by screws, in such manner that there is a rigid association between all of the lock bars 25 whereby they will close to precise positions determined by stop means described below.

DESCRIPTION OF THE CASING-OPENING CYLINDERS, AND OF THE GENERAL MANNER OF OPERATION OF THE APPARATUS AS THUS-FAR DESCRIBED

After the apparatus has been unlocked and unhooked, the casing may be opened to the position shown in FIG. 5 by operation of cylinders 61 only one of which is shown. One end of each cylinder 61 is pivoted at 62 to a pin which extends between the upper and lower walls of housing 26. The other end of each such cylinder is pivoted at 63 to a bracket 64 bolted to one of the ribs 15.

In the general operation of the tool as thus-far described, the pipe elements 28-30 (FIG. 8) are introduced laterally into the apparatus when the casing and cage are in the wide-open position of FIG. 5, following which cylinders 61 are actuated to close the casing and cage. Cylinder 54 is operated to pivot the lock bars 25 to the closed position of FIG. 4, cylinder 46 is operated to effect pivotal movement of hooks 32 to positions adjacent index and closing pins 41, and cylinders 37 are operated to cause the hooks to shift pins 41 and thereby effect pressure closing of the casing despite the presence of the rubber in the seal means.

The lock pin 20 is then shifted downwardly as described below, creating a very strong locking action which prevents the casing and cage from opening despite the extreme test pressures present in the annular test chamber 27. It is of much importance that the parts be properly registered in order that the lock pin 20 may thus be shifted to locking condition, and the means for effecting such precise registry are described under the next subheading.

After the test chamber 27 (FIG. 8) is thus defined, and sealed as stated subsequently in this specification, fluid (preferably water) under very high pressure is injected into the test chamber from a pressure source represented schematically at 66 in FIG. 11. Such source 66 connects through a pipe 67 to a port 68 in casing portion 11. Because of the fact that the test chamber is not defined by rubber, but instead primarily by metal, mounting and sealing the pipe 67 (the fitting connecting the same to port 68) is much simplified.

After the pressure in test chamber 27 reaches a very high value, which may be tens of thousands of psi, introduction of fluid from source 66 is stopped. It is then determined whether or not the pressure in test chamber 27 reduces. If there is no reduction, it means that there is no leak in the interconnected pipe elements 28-30. If the pressure does reduce, it means that fluid is leaking inwardly from the test chamber 27 through one or more joints between elements 28-29 and the collar 30. The pressure is read by a gauge means which is represented schematically at 69 in FIG. 1.

DESCRIPTION OF THE MEANS FOR ACTUATING LOCK PIN 20, AND OF THE MEANS FOR EFFECTING PRECISE REGISTRY OF THE HOLES THROUGH WHICH THE LOCK PIN 20 PASSES

The lock pin 20 is connected to a piston 71 (FIG. 1) which is mounted slidably in a cylinder housing 72 having a flange 73 at the lower end thereof. Flange 73 is suitably connected by means, not shown, to a corresponding plate 74 which is mounted by the previously-indicated bolts 43 and 44 to the uppermost rib 15 (FIG. 3). The position of mounting is such that the pin 20 registers with the uppermost bore (described below) in ribs 15.

Cylinder housing 72 is sufficiently long that piston 71 may be shifted upwardly until the lower end of pin 20 is above the uppermost lock bar 25, as shown in FIG. 3, thus permitting all of the lock bars 25 to be pivoted outwardly about pin 19 as shown in FIG. 5, and in response to operation of cylinder 54. As in the case of the various cylinders 37, 46, 54 and 61 described above, cylinder housing 72 is associated with suitable hydraulic lines (or pneumatic lines), and with valves which are incorporated in housing 26. Each of these cylinders is double acting, so that operation of the associated valve means (not shown) may shift the various pistons in both directions.

As shown in FIG. 3, the lower end of lock pin 20 is beveled at 76. This, however, is only a safety precaution, it being emphasized that before cylinder 72 may be operated to shift piston 71 and pin 20 downwardly to the lock position shown in dashed-lines in FIG. 1, the various bores in lock bars 25, and the corresponding bores in ribs 15, must be in registry in order to insure that the pin will not bind. As another safety precaution, the lock pin diameter is made slightly undersize (for example, 0.020 inch) relative to the bore diameter.

In FIGS. 3 and 16, the bores in ribs 15 are numbered 77, whereas the bores in lock bars 25 are numbered 78. Each set of such bores has a common axis. There are three means for causing bores 77 and 78 to register with each other and to be in alignment with pin 20, such means being described in detail below.

The first means for effecting registry or alignment of bores 77 and 78 in elements 15 and 25, so that pin 20 may be readily inserted by the piston means, constitute the hooks 32 and the associated seal rubber. Referring particularly to FIG. 2a, it is to be noted that the protruding hook portion 79 of each hook 32 has mounted thereon a shim 80 and also a recessed pad 81 formed of hard metal. Shim 80 is interposed between the hook portion 79 and the recessed pad 81, being held in position by the illustrated screw means. The recess in pad 81 is adapted to provide a close fit with the index and closing pin 41.

The thickness of shim 80 is so adjusted, by empirical methods, that when the apparatus is in the fully-closed position of FIGS. 1 and 2, but prior to the insertion of lock pin 20 through the bores 77 and 78, such bores will be in registry (relative to one of two perpendicular planes) as shown in FIG. 3.

It is emphasized that the rubber in the seal means effects continuous forcing of index pin 41 against the recessed pad 81 when the apparatus is fully closed. Thus, the interrelationships between the rubber in the seal means, the shimmed pad 81, and the hooks 32 effectively position the parts in such manner that there is registry relative to one of two perpendicular planes.

(It is to be noted that there are preferably small gaps provided between the cylinder sections 10 and 11, even when the same are in closed conditions, and small gaps provided between extrusion-prevention and index bars 88 and the bottoms of the associated grooves, the result being that the closed position is determined solely by pins 41, etc., and not by the casing sections, bars 88, etc.)

To provide registry relative to the other of the two planes, such two planes being vertical and being perpendicular to each other, stop means 82 are provided as shown in FIGS. 6 and 6a. Such stop means 82 constitute the second means for effecting the above-indicated registry or alignment of the bores. Stated more definitely, there are two pairs of stops 82, one below the uppermost rib 15 and one above the lowermost rib 15 (the latter pair, not shown, being the mirror image of the former). The stops 82 in each pair are adapted to be engaged, as shown in FIGS. 6 and 6a, by straight rear side portions of the uppermost and lowermost lock bars 25, thus determining the positions of such lock bars when cylinder 54 is pressing thereagainst (maintaining the lock bars closed as distinguished from open).

Shims 83 (FIG. 6a) may be provided adjacent each stop means 82 to determine the precise closed positions of the lock bars 25. All of the lock bars 25 are connected correspondingly, for example by means of the connector bar 58, in such manner that only the two pairs of stop means 82 (and associated shims 83) need be provided. It is, however, pointed out that, if desired or necessary, shims may be interposed between connector bar 58 and various ones of the associated lock bars 25 in order to effect precision adjustment of the latter.

Preferably, one stop 82 is secured by screws to the underside of one rib 15, whereas the other stop 82 in each pair is secured by screws to the upper side of the adjacent rib 15.

To minimize wear and jarring in the apparatus, the cylinder 54 which closes the lock bars 25 to the position of FIG. 7 may be provided with suitable spring means to cushion the shock, so that the bars 25 cannot slam against the stops 82 but instead engage the same gently. Other and equivalent means for this purpose may comprise restrictor valves, rubber elements, etc.

In summary, therefore, the stop and shim means 82–83 (FIGS. 6 and 6a) adjust the lock bars 25 (when in closed condition), relative to a plane $P_4$ (FIG. 6) containing the axis of the bores 77 in ribs 15, until the common axis of the bores 78 lies in such plane $P_4$. The hook and shim means shown in FIGS. 2 and 2a adjust relative to a second plane $P_3$ (FIG. 6), also containing the common axis of the bores 77 in ribs 15, until the common axis of the bores 78 is in such plane $P_3$. As indicated above, the planes $P_3$ and $P_4$ are perpendicular to each other and intersect at the common axis of bores 77.

The third means for effecting precise registry of bores 77 and 78 in order that the lock pin 20 may be inserted therethrough is (like the hooks 32 and associated index and closing pins 41) also important in creating and maintaining the seals for the test chamber 27. Such third means comprises combination index and extrusion-prevention bars 88 and their associated grooves 89, these being shown (for example) in FIGS. 11, 13 and 16.

Figure 11:
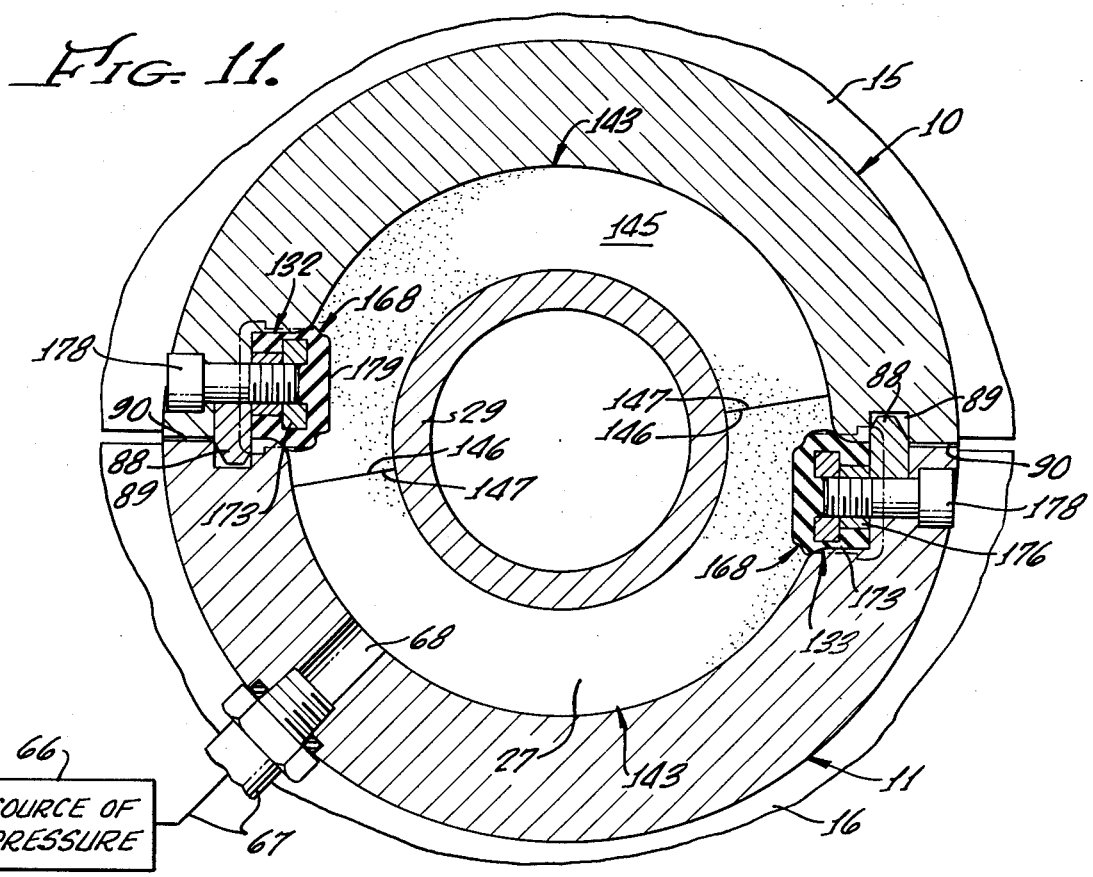

Referring to FIG. 11, the two casing sections 10 and 11 are somewhat separated from each other at a diametral plane containing the axis of the apparatus, so that opposed faces are provided on such elements 10–11 at the diametral plane. Such opposed faces are indicated by reference numbers 90 and are preferably close together but (as stated above) not touching. Each of the elements 10–11 has, in one of its faces 90, the groove 89 which is rectangular in section as best shown in FIG. 13. Each of elements 10–11 has, in the other of its opposed faces, a recess or indentation 91 which is also rectangularly shaped and is adapted to receive the majority of the associated extrusion-prevention and index bar 88. Each bar 88 is mounted in a recess 91 and secured in position by screws 92 (FIG. 9) which extend through the associated casing section.

Each bar 88 extends sufficiently far out of its recess 91 that it will (when the casing is closed) enter the groove 89 opposed thereto but will preferably not touch the bottom of the latter groove even when the casing is fully closed. The edge portion of each index bar which thus protrudes into the opposed groove 89 is, as shown (for example) in FIG. 13, a close fit in the groove 89. Accordingly, when the apparatus is closed, the bars 88 perform a precise indexing function which insures that the casing sections 10 and 11 are properly registered with each other and this, in turn, is a substantial factor causing the bores 77–78 to be in proper alignment for reception of lock pin 20.

The protruding edge of bar 88 which is relatively adjacent the axis of the apparatus is provided with a relatively short bevel as shown at 93 in FIG. 13. The protruding edge portion of the bar 88 which is relatively remote from the axis of the apparatus is provided with a much longer bevel as shown at 94 in FIG. 13. These bevels facilitate closing of the apparatus, in the desired manner, and (in the case of the short bevel 93) facilitate compression of the seal strips forming part of the seal means for the test chamber. Even the long bevel is insufficiently long to extend out of the groove 89 when the apparatus is fully closed.

Referring to FIGS. 8 and 9, the bars 88, grooves 89, etc., extend for the full length of the illustrated seal means, not only for the full length of the longitudinal seals described below but also adjacent the circumferential seals.

DESCRIPTION OF THE SEAL MEANS

There are formed longitudinally in the respective casing sections 10 and 11, for the full lengths thereof (namely, between the necked-down regions 12, FIG. 8) groove means 132 and 133 which are preferably diametrically opposite each other. Such groove means are adapted to receive rubber seal elements, as well as portions of the inserts in such elements. The "groove means" presently referred to are those for the rubber seal elements, not for the index and extrusion-prevention bars 88 described elsewhere in this specification.

Referring particularly to FIG. 13, the illustrated groove means 132 has one generally radial side wall 134, formed in casing section 10, and an opposed generally radial side wall 135 formed by casing section 11. The respective walls 134 and 135 merge through rounded edge regions 136 and 137 with the generally cylindrical interior surfaces of the casing sections 10–11. The walls 134–135, including the adjacent portions of the rounded regions 136–137, form the side walls of the groove means 132.

Again referring to FIG. 13, the bottom wall of the groove means 132 is formed by a wall 138, such wall being a portion of casing section 10. The remainder of the bottom groove wall is formed by a wall portion 139, such wall portion 139 being flush with wall 138 and being the inner surface of index and extrusion-prevention bar 88.

The wall 135, which has a smaller generally radial dimension than does wall 134, is generally coplanar with the opposed edge faces 90 of the respective casing sections 10–11.

The above description of the groove means 132, given relative to FIG. 13, applies also to the groove means 133 since (as shown in FIGS. 7 and 11) the parts are corresponding. Thus, the groove means 132 is formed primarily in casing section 10 whereas the groove means 133 is formed primarily in casing section 11.

The relationship stated in the previous paragraph is one aspect of a feature of the present apparatus whereby the casing sections 10 and 11 and associated parts are substantially identical to each other. Furthermore, the opposed longitudinal seals (described below) are substantially identical to each other, as are the seal segments at the ends of the test chamber. The present apparatus is characterized by a large proportion of interchangeable parts, all of which facilitates manufacturing, shipment, storage, inventory control, etc.

Seal elements are provided at each end of the test chamber 27, and comprise arcuate seal segments 143 one of which is mounted in casing section 10 and the other of which is mounted in casing section 11. It is a feature of the present apparatus that such seal segments 143 can be, and preferably are, identical to each other so that they are made in the same mold. Preferably, there are two such segments, as illustrated, and each occupies substantially 180 degrees (when the casing is closed) of the circumference of the apparatus. Since segments 143 are identical, they have been given the same general reference numeral. They are described in detail with particular reference to FIGS. 10, 12, 14, 15, 17 and 19.

Each segment 143 is generally rectangular in cross-sectional shape, being disposed adjacent the first necked-down region 12 of a casing section 10 or 11. Each segment is formed primarily of rubber, and extends (prior to compression) for substantially more than 180° in order that there will be a major amount of sealing compression between the ends of the segments when the casing is closed. Although each segment extends for substantially more than 180° of a circle, there is no difficulty in mounting the segments in position since they are not connected to each other and since mounting is effected when the casing is open.

The rubber body 145 of each seal segment has two end faces which are illustrated as lying generally in radial planes, such end faces being numbered 146 and 147 (bottom of FIG. 12). It is these faces which are in very close bearing engagement with each other when the casing is closed, thus preventing leakage of fluid therebetween.

The engaged end faces 146 and 147 are preferably not radially adjacent the edge faces 90 of the closed casing sections. Such engaged end faces 146–147 are, when the casing is closed, spaced somewhat from outwardly-extending protuberances 148 one of which is formed on each arcuate seal segment 143, which protuberances 148 nest in the ends of the respective groove means 132 and 133 described above.

There are molded into each rubber body 145 two inserts 150 and 151 which perform numerous functions including permitting creation of initial sealing compression (as that term is described at the beginning of this specification under "Definitions"). Insert 150 is generally arcuate, one end thereof being spaced a short distance from end face 146, and the other end thereof being spaced a short distance from protuberance 148. As best shown in FIG. 14, the upper and lower surfaces of insert 150 have spaced teeth 152 thereon. The gaps 153 between the teeth 152 are sufficiently large to permit a certain amount of flow of rubber through such gaps when the arcuate seal segment is under very high loads.

Figure 15:
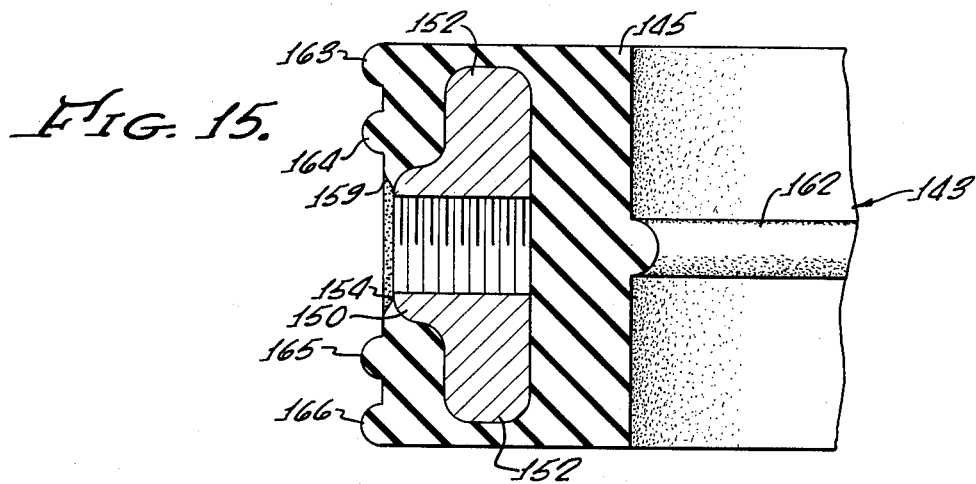
FIG. 15 is a vertical sectional view on line 15—15 of FIG. 12.

Insert 150 is bored and threaded, at the end thereof remote from protuberance 148, to receive a screw 156 (FIG. 10) which extends through the associated casing section. Such screw is one of the two screws not only effecting mounting but also creating initial sealing compression in the arcuate seal segment, as described below. Reference is made to FIG. 15, showing the internally-threaded radial bore for the screw 156.

The second insert 151 is generally wing-shaped, or clip-shaped, having two angularly-related wings which are somewhat spaced, respectively, from the rounded edges 136 and 137 (FIG. 13) of each groove means 132 and 133 (FIGS. 8 and 10).

An internally-threaded bushing 157 is welded to the wing-shaped insert 151 at the outer central portion thereof, and extends radially-outwardly toward the bottom wall of the groove means 132 or 133 in which the protuberance 148 is disposed. A second screw 158 extends radially-inwardly through the casing and is threaded into bushing 157 to perform functions including (1) achievement of initial sealing compression, and (2) the mounting function.

As shown at 160 in FIGS. 12, 17 and 19, the outer surface of bushing 157 is not flush with the outer surface of segment body 145 (at protuberance 148) prior to application of initial sealing compression forces. Instead, there is a very substantial indentation or recess in the rubber adjacent surface 160 prior to application of initial sealing compression.

Also, as shown in FIG. 15, there is a substantial spacing between the entire outer surface 154 of insert 150 and the outer vertical surface of segment body 145. Thus, the parts do not assume the positions shown, for example, in FIG. 10 until both of the screws 156 and 158 have been tightened in order to cause a substantial degree of compression of the rubber, thus creating the "initial sealing compression" previously referred to. Recesses 159 in the rubber permit the screws 156 to enter inserts 150.

The bushing 157 only permits the initial sealing compression to be increased until the bushing seats, so that there is a predetermined initial compression or sealing force at such region.

The bushing 157 seats on the bottom of the groove in which it is mounted. The surface 154 does not seat on the cylindrical internal surface of the casing section, but is relatively close thereto after screw 156 has been turned a predetermined desired number of times.

It is emphasized that the wings of the insert 151, which wings are preferably rounded correspondingly to the rounded edges 136 and 137 (FIG. 13) of the groove, provide a great deal of compression relative to such rounded edges 136–137 to thus prevent passage of water or other fluid through such regions.

Referring particularly to FIG. 15, the internal surface of each segment body 145 is provided with an annular bead 162, whereas the outer surface is provided with four beads 163–166, two being above the recess 159 and two being below the same. Bead 162 projects radially inwardly for pressure engagement with the external cylindrical surface of the pipe when the apparatus is closed, whereas beads 163–166 extend outwardly for pressure engagement with the internal cylindrical surface of the casing section. The beads provide regions of especially high pressure, which augments the sealing action at the beaded regions.

There are shown in phantom lines in FIG. 10, which figure shows the arcuate seal segments 143 after the casing has been closed on the pipe 29, the various positions where the outer portions of the beads 162–166 would be if there were no compression. It will thus be seen that there is a great deal of radial compression against the interior walls of the casing sections, against the walls of the groove means 132–133, and against the pipe. The radial-outward compression is effected first by the tightening of the screws 156 and 158 as described above. Compression is augmented, both outwardly and inwardly, when the apparatus is closed on the pipe to create the augmented sealing compression defined above.

Finally, when the fluid is introduced at many thousands of psi pressure into the test chamber 27, such fluid compresses longitudinally (namely, upwardly and downwardly as viewed in FIG. 8) and effects a squeezing action which causes additional radial-inward and radial-outward flow of the rubber to further augment the sealing action at the arcuate seal segments 143. There are thus three stages of sealing, namely prior to closing of the casing, after full closing of the casing, and after injection of high-pressure fluid into the test chamber, and these three stages build up extremely high sealing pressures adapted to prevent leakage of fluid outwardly from the test chamber despite the fact that the pressures are enormously high as indicated.

Each arcuate insert 150 is preferably formed of aluminum or some other lightweight material, although it may be formed of steel, nylon, etc. The insert (or clip) 151 is preferably formed of steel.

Referring next to FIGS. 11 and 12–13, there are two identical longitudinal seal strips 168 adapted to be received in groove means 132 and 133 between the arcuate seal segments 143. Furthermore, the seal strips overlap the seal segments in predetermined sealing relationship as described in detail below.

Each longitudinal seal strip 168 comprises an elongated mass of rubber which has, when not compressed in any way, the cross-sectional shape indicated in phantom lines at 169 in FIG. 13. Thus, as illustrated, the uncompressed cross-sectional shape is generally rectangular, with radially-outwardly extending flanges 171 relatively adjacent the bottom of the groove 132 or 133. Each such flange is rounded at 172, at its corner remote from the center of the seal. In summary, therefore, the cross-sectional shape of each seal strip 168 is generally T-shaped, the stem of the T being extremely wide relative to the length of the cross member.

Molded into each seal strip 168 is an insert bar 173 of rectangular section, the ends of such bar being relatively close to (but spaced from) the ends of the seal strip as shown in FIG. 8. One edge of insert bar 173, which edge is numbered 174 in FIG. 13, is relatively close to the corresponding side of the seal strip body (which side is shown in phantom lines in FIG. 13). The other edge 175 of the insert bar is relatively remote from the corresponding side of the seal strip body.

Welded at spaced points along the insert bar 173 are internally-threaded bushings 176, FIG. 8, the outer ends of such bushings being recessed beneath the outer surface of the seal strip prior to application of compression forces. These recesses are shown at 177 in FIG. 12. Thus, it is not until screws 178 (FIG. 8) have been threaded into bushings 176, and tightened, that the bushings 176 are drawn outwardly until they seat on the bottom wall of the associated groove 132 or 133, as shown in FIG. 8. The regions of the rubber body of each seal strip inwardly of each screw end are made inwardly protuberant, as shown at 179, to aid in sealing around such screw ends. As described above relative to screws 158 employed relative to the arcuate seal segments, the bushings provide a stop function which insures against excessive compression of the rubber by the screws 178.

The longitudinal seal strips 168 are readily mounted to the casing sections 10 and 11 when the casing is in open condition. FIG. 19 shows one of the seal strips 168 in the process of being mounted, whereas FIG. 13 shows a seal strip after the casing has been closed and the strip thus compressed between the opposed walls 134 and 135 of the groove means 132 or 133.

To mount each longitudinal seal strip, it is merely necessary to insert screws 178 and then tighten them until the bushings 176 seat on the bottom wall of the associated groove means. This tightening of the screws causes collapsing of one of the flanges 171 (FIGS. 12 and 13) of the seal strip, such one flange being the one relatively adjacent the corner between the surfaces 134 and 138 shown in FIG. 13. The remaining flange 171 is not then laterally compressed, reference being made to FIG. 20. However, the seal strip is compressed in a radial direction due to the clamping action exerted between insert bar 173 and the bottom wall surfaces 138–139 (FIG. 13) of the groove means. In this manner, initial sealing compression is provided between the seal strip 168 and groove walls 134 and 138–139 (FIG. 13).

Thereafter, when the casing is closed, the sealing force is augmented and the remaining flange 171 is compressed greatly by groove wall 135. The concentration of sealing forces is greatest in the bottom of the groove due to the presence of the two flanges 171. Then, when high-pressure test fluid is introduced into the test chamber 27, FIG. 8, the sealing forces are augmented due to radial-outward movement of the seal strips in response to the extremely high pressures — thus creating the final sealing pressure.

One of the most highly critical sealing regions in the entire apparatus is that region where each of the seal strips 168 engages an associated arcuate seal segment 143. It is emphasized that there is no movement between each end of a seal strip, and the associated region of the arcuate seal segment, when the casing opens and closes. The word "movement" is here employed to denote sliding, etc., as distinguished from bulging and compressing under pressure. Thus, referring to the isometric view of FIG. 12, it is pointed out that the engaged radial faces or surfaces 146–147 at the ends of the arcuate seal segments are circumferentially offset from the protuberances 148, and that it is at such protuberances 148 (and in the groove means 132–133) that the longitudinal seals engage the arcuate seals.

There is provided at each end of each longitudinal seal strip 168 a tongue 181 which fits into an associated notch 182 or 183 in the protuberance 148 of the arcuate seal segment. At the regions of engagement between the seal strips and the arcuate seal segments at the top of the apparatus, the tongues 181 seat in notches 182 (which are the lowermost notches). At the regions of engagement between the seal strips and the lower arcuate seal segments, the tongues 181 seat in notches 183 (which are the uppermost notches). It is within the scope of the invention to fill in the unused notch 182 or 183, with rubber or metal or some other substance, in order to augment the sealing action.

The cross-sectional shape of each tongue 181, in a horizontal plane, is the same as that of the cross member of the T-shaped longitudinal seal strips, having the same flanges or edges 171 shown (for example) in FIG. 12. Each tongue 181 is initially compressed in the bottom of its groove 132 or 133 upon tightening of the screws 158 (FIG. 19) which move the inserts 151 radially-outwardly. Then, when the casing is closed, augmented sealing compression is created at each tongue 181 due to the bulging of the rubber bodies 145 as shown at the bottom of FIG. 8, there being a very high radial compressive force between the pipe and the bottom wall of the groove. Finally, when test pressure is caused to be present in the test chamber 27, the longitudinal and radial pressures exerted by the pressurized fluid causes compression of rubber bodies 145 and 168 and consequent additional forces which further seal the tongues. In the described manner, therefore, the critical regions of engagement between the longitudinal seal strips and the arcuate seal segments are fully sealed.

Referring to FIG. 12, it is pointed out that the ends of beads 163 and 164, or 165 and 166 (depending upon which end of the test chamber is referred to), at protuberances 148, are adapted to engage flatwise the tongues 181 at the ends of the seal strips. This creates additional sealing regions preventing leakage of fluid from the test chamber upwardly (or downwardly) along the outer surfaces of the arcuate seal segments. Such beads curve onto the protuberances 148 as shown, for example, in FIGS. 12 and 17.

There is an additional bead 167 (FIGS. 12 and 17) which extends vertically between the adjacent beads 164 and 165, at the outer region of each side of each protuberance 148. Such additional bead aids in preventing leakage of fluid into the bottoms of the grooves 132–133 (FIG. 11).

Secondary seals (such as O-rings) may be provided around any or all of the various screws 156, 158 and 178 to provide secondary sealing actions. Each of such screws extends through an associated casing section, and the seal may be provided (for example) in such section adjacent the head of the screw.

In summary, therefore, the arcuate seal segments 143 and the longitudinal seal strips 168 are readily mounted in the casing when the latter is in open condition, by inserting and tightening the various screws 156, 158 and 178. Reference is again made to FIG. 19, which shows the conditions of the parts before the screws are tightened. Preferably, the longitudinal seal strips 168 are first mounted and compressed, by means of the screws 178 and as described above, until the bushings 176 seat to provide the predetermined initial sealing compression. Thereafter, the screws 156 and 158 are inserted and tightened to provide the initial radial-outward compression relative to the arcuate seal segments 143, and to provide the initial sealing compression relative to tongues 181 as described above.

The various recesses 159, 160 and 177 substantially disappear as the result of the outward movement and seating of the bushings, etc. Furthermore, during initial, augmented and/or final sealing, the various beads substantially disappear but they are nevertheless effective to provide regions of pressure concentration.

Referring, for example, to FIG. 13, and as previously described, a portion of the bottom wall of each groove means 132 and 133 is formed by a surface 139. Such surface 139 is a major portion of the inner wall of the above-described index and extrusion-prevention bar 88 which is seated in recess or indentation 91 in each casing section adjacent the groove means. Such indentation is formed by perpendicularly-related walls (FIG. 13).

Each index and extrusion-prevention bar extends (as previously stated) for the full length of the longitudinal and end seal means, reference being made to FIG. 8. The inner edge of each bar 88 (that edge remote from the bevels 93 and 94) is provided with various notches in order to receive the above-described screws 158 and 178 as shown in FIG. 9.

The indexing functions of bars 88 were described above. Relative to the extrusion-prevention functions thereof, it is emphasized that there is a considerable amount of extension of the surface region 139a (FIG. 13) of each index bar past the surface 135 (of the casing section), surface or wall 135 being at right angles to surface 139a. Therefore, when the casing stretches due to the presence of extremely high fluid pressures therein, such stretching does not create or enlarge any gap. There is therefore an excellent extrusion-prevention function performed at the right-angle junction between surfaces 139 and 135, regardless of casing stretching. Surface 139a is in close engagement with the inner wall of groove 89.

The region of surface 139 which overlaps the opposite casing section, namely the region indicated at 139a in FIG. 13, further serves the purpose of providing a back-up for the seal strip 168 (namely, at the lower flange 171, as shown in FIG. 13, of such seal strip) when the casing is closing as shown in FIG. 20. Thus, when the casing closes, the lower flange 171 (FIG. 13) is not pinched between opposing masses of metal but instead is smoothly compressed to the position shown in full lines in FIG. 13.

The bars 88 prevent radial-outward extrusion not only of the rubber in the strip seals 168 but also of the rubber in the protuberant portions 148 of the arcuate seal segments 143. To prevent longitudinal (upward or downward) extrusion of the rubber in the arcuate seal segments, wedge means are provided as shown in FIGS. 6, 8 and 18.

The wedge means comprises (at each end of the tool) a back-up ring (formed in two halves or segments 193 corresponding to the two casing sections 10 and 11) and which is secured in position by screws 194 as shown in FIGS. 6 and 18, such screws extending through the casing. Stated more definitely, each ring segment 193 seats in the second necked-down portion 13 (FIG. 8) of the casing end.

Movably mounted beneath the ring segments 193, which have lower inclined surfaces converging in a direction away from the center of the test chamber, are wedge segments 195. Such segments are held in position, loosely, by screws 196, FIG. 18, and have inclined surfaces which cooperate with the lower surfaces of ring segments 193. The relationships are such that longitudinally-outward (upward or downward) movement of the wedge segments 195 (resulting from creation of sealing pressures) tends to cause movement of the wedge segments 195 into extremely close abutment with the adjacent region of the pipe, thus maximizing the extrusion-prevention function.

SUMMARY OF OPERATION

Let it be assumed that the apparatus is initially in the wide-open position shown in FIG. 5, and that the seal means have not as yet been mounted therein. Let it also be assumed that the shims 80 and 83 (FIGS. 2a and 6a) and the bars 88 have been so predetermined that, when the apparatus is closed the bores 78 will be in registry with bores 77 (FIGS. 3 and 16).

As previously indicated, the arcuate seal segments 143 are identical with each other, as are the longitudinal seal strips 168, so that all of these seal elements may be molded in only two molds. Because of the small number of mold inserts in each mold, the molding operation is simple. Furthermore, the small sizes of the seal elements, and other factors, make them easy to manufacture, store and ship.

The longitudinal seal strips 168 are first mounted in position by inserting the screws 178 and tightening them, the parts then assuming the positions shown in FIG. 20—only two sides of each seal strip being under initial sealing compression. Such tightening of screws 178 (and subsequent tightening of screws 158) is continued only a predetermined amount, namely until the bushings 176 seat on the bottom walls of the grooves 132 and 133 (Figs. 8 and 11). Thus, the precise amount of the initial sealing compression is determined by the length of the bushings, and by the lateral spacing of the holes (for screws 178) from side wall 134 (FIG. 13) of each groove means. The rounded edge 136 (FIG. 13) aids in the drawing of the seal strips into the groove means.

The four arcuate seal segments 143 are then mounted in position at the upper and lower ends of the apparatus. This is done by inserting and tightening the screws 156 and 158. As described above, the tightening of screws 158 also effects initial sealing compression relative to the tongues 181 which fit in notches 182 or 183 in the arcuate seal segments.

The pipe 28–30 is then introduced laterally into the present apparatus, and valve means (not shown) are operated to effect extension of cylinders 61, thus pivoting casing section 10 counterclockwise from the position of FIG. 5 to a position relatively close to (but not at) that of FIG. 4. The pivotal movement stops when the faces 146–147 at the ends of the arcuate seal segments engage each other, and when the uncompressed flanges 171 of the seal strips 168 engage walls 135 of the casing sections. Thus, cylinders 61 do not effect the achievement of much augmented sealing compression in various seals, and they need not be powerful cylinders.

Cylinder 54 (FIG. 7) is then extended to effect clockwise pivotal movement of the lock bars 25 from the position of FIG. 5 to that of FIGS. 2, 4 and 6, the lock bars nesting between the ribs 15 of the cage. Such pivotal movement continues until stops 82 (FIGS. 6 and 6a) are engaged. The operation of cylinder 54 is effected by manipulating suitable valve means, not shown.

At approximately the same time that the lock bars 25 are pivoted as described above, cylinder 46 (FIG. 6) is shortened to cause clockwise pivotal movement of cranks 52 (FIGS. 1 and 6) and thus pivot hooks 32 clockwise (FIGS. 2, 4 and 5) until the pads 81 are adjacent index pins 41 (near the positions of FIGS. 2 and 2a). The pins 41, and the stroke of cylinder 46, limit the amount of such clockwise movement of the hooks 32.

Thereafter, cylinders 37 are shortened, through the operation of suitable unshown valve means, to cause levers 34 to pivot counterclockwise, thus pulling the pads 81 until the index pins 41 are in predetermined positions determined by the shims 80 (FIG. 2). As described, these predetermined positions caused by shims 80 and by the stop means 82 are such that the bores 77 and 78 (FIG. 3) are in substantially precise alignment with each other and with pin 20.

Cylinder 72 is then operated, through manipulation suitable valve means, not shown, to cause downward movement of lock pin 20 through bores 77 and 78, all the way to the bottom of the apparatus. Thus, the lock pin 20 performs the same function as do pins 17–19 in providing the substantially symmetrical cage which uniformly and effectively reinforces the casing sections 10 and 11 so that extremely high pressures may be contained therein. As described above, cylinders 37 preferably do not perform locking functions because of the described non-overcenter relationship whereby an inadvertent failure to extend the lock pin 20 does not permit any breakage of parts but instead mere opening of the casing to release the pressure.

When the casing is closed to its final position of FIG. 2, the desired augmented sealing compression is created at interfaces 146 and 147 and at the flanges 171, beads 163–167, and other parts. Thus, the sealing compression resulting from closing of the casing is added to that created initially by the screws 156, 158 and 178, to result in a large degree of sealing prior to the time that any fluid is introduced into the test chamber 27.

It is emphasized that the above-described extension of cylinders 61 causes proper mating of the casing sections 10 and 11 due to several factors, including the seating of the arcuate seal segments 143 on the pipe, and due to introduction of beveled bars 88 into grooves 89. Such beveled bars 88 cooperate (FIG. 20) with grooves 89 to aid in the indexing function described above relative to the shims 80 and 83.

The apparatus thus being closed and effectively sealed, fluid (preferably water) is introduced (by operating a suitable valve) from source 66 (FIG. 11) through pipe 67 into test chamber 27, and fluid pressure is increased until it is many thousands of psi — preferably far above ten thousand psi. This fluid pressure in the test chamber creates the final sealing compression in the various seals, since it energizes such seals and increases the pressures at the interfaces. The pressure is read by the gauge 69 and, when full test pressure is reached, the introduction of fluid is stopped. Then the operator waits a few seconds to see whether there is any loss of pressure (indicating a leak into the pipe through one of the joints between pipe sections 28–29 and collar 30).

After the test is thus completed, pressure is released from the test chamber through the pipe 67 (by operation of suitable valve means associated with pressure source 66), following which the above-described sequence of cylinder operation is repeated but in the reverse manner whereby the apparatus is returned to its fully-open condition of FIG. 5. The pipe is then removed, and the described operating cycle repeated for another pipe joint.

The present apparatus may also incorporate gear teeth (not shown) which are mounted on the casing halves in mutually-meshing relationship, between the hinge pins 17 and 18, and which insure that predetermined relationships will be maintained between the opposed casing sections 10 and 11 (and associated cage elements) as the jaws open and close.

The foregoing detailed description is to be clearly understood as given by way of illustration and example only, the spirit and scope of this invention being limited solely by the appended claims.

We claim:
1. Apparatus for effecting external testing of a length of pipe to determine whether there is a leak therein, which apparatus comprises:
   a. a plurality of casing sections adapted to open for lateral reception of a length of pipe, and further adapted to close and thus form a chamber around said pipe,
   b. a cage provided around said casing sections to strengthen the same,
      said cage being adapted to open for lateral reception of said length of pipe, and to close and thus effect said strengthening of said casing sections,
      said cage when in closed condition being symmetrical about two planes which are perpendicular to each other and intersect along a line generally parallel to the axis of said pipe,
         whereby said casing sections are effectively strengthened,
      said cage when in closed condition having overlapped cage elements through which are provided bores extending longitudinally of said pipe,
   c. means to lock said cage in closed condition,
      said lock means including a lock pin adapted to move through said bores in said overlapped cage elements, thereby locking said cage in closed condition,
      said lock means further including power means to shift said lock pin longitudinally of said pipe between locking and unlocking positions,
   d. means to seal said chamber around said pipe length, when said casing sections and cage are in closed conditions, to thus prevent escape of fluid from said chamber except through a leak in said pipe,
   e. means to inject fluid into said sealed chamber and to cause the pressure of said fluid in said chamber to increase to many thousands of psi, and
   f. means to sense a reduction of the pressure in the thus-pressurized chamber,
      said pressure reduction indicating the presence of a leak in the pipe length being tested.

2. The invention as claimed in claim 1, in which said seal means have portions adapted to resist full closing of said casing sections, and to be pressurized in response to full closing of said casing sections, and in which means are provided to fully close said casing sections despite the resistance of said seal means.

3. The invention as claimed in claim 2, in which said means to fully close said casing sections include power-operated hook means.

4. The invention as claimed in claim 3, in which said hook means are so constructed and mounted that pressurization of said sealed chamber when said lock pin is in unlocking position will not effect breaking of said hook means but will instead cause unhooking of said hook means to thus permit escape of fluid from said chamber.

5. The invention as claimed in claim 3, in which means are associated with said hook means and with said cage to cause said bores in said overlapped cage elements to be registered with each other in response to full closing of said casing sections by said hook means.

6. The invention as claimed in claim 1, in which means are provided to effect accurate registry of said bores in said overlapped cage elements in response to full closing of said casing sections, whereby said lock pin may be inserted through said bores without binding.

7. The invention as claimed in claim 1, in which said casing sections comprise two generally semicylindrical hollow casing elements, and in which said cage comprises parallel ribs secured externally to said casing elements, further includes hinge bars provided in overlapped relationship to said ribs and extending across the gap between one set of opposed edges of said casing elements, further includes lock bars provided in overlapped relationship to said ribs and extending across the gap between the other set of opposed edges of said casing elements, and further includes four pins extending longitudinally of said pipe through bores in the overlapped regions of said bars and ribs, one of said pins being on each side of each of said gaps, one of said pins being said lock pin.

8. The invention as claimed in claim 7, in which power means are provided to pivot said lock bars about one of said pins, said one pin being on the same side of said pipe as said lock pin.

9. The invention as claimed in claim 7, in which said seal means have portions adapted to resist full closing of said casing sections, and to be pressurized in response to full closing of said casing sections, in which power means are provided to fully close said casing sections despite the resistance of said seal means, and in which index means are provided to effect substantially precise registry of said bores in said overlapped cage elements whereby said lock pin may be inserted without binding.

10. The invention as claimed in claim 1, in which said line of intersection of said two planes is generally coincident with the axis of said pipe.

11. Apparatus for testing pipe sections for leakage, comprising:
  a. casing means adapted to open for lateral reception of a pipe section to be tested, and thereafter to close around said pipe section in such manner that there is a space within said casing means and outside of at least part of said pipe section,
  b. means mounted on said casing means to form in said space a chamber which is sealed when said casing means is in fully closed condition,
    one wall of said sealed chamber being said part of said pipe section,
    said means including at least one sealing edge formed of rubber and extending longitudinally of said pipe section,
    said longitudinal sealing edge being placed under a high degree of compression in response to full closing of said casing means,
  c. first power means to close said casing means to a condition substantially less than fully closed,
  d. second power means to forcibly and fully close said casing means to thus place said sealing edge under said high degree of compression,
  e. power means to extend at least one lock pin longitudinally of said pipe section through openings provided in different parts of said casing means,
    said openings being registered with each other when said casing means is fully closed, whereby to lock said casing in fully closed condition,
  f. means to inject test fluid into said sealed chamber and to increase the pressure of said fluid in said chamber to many thousands of psi, and
  g. means to indicate a reduction in the pressure in said pressurized chamber whereby it is known that there is a leak in the pipe section being tested.

12. The invention as claimed in claim 11, in which said means recited in clause (d) comprise hook means provided on one part of said casing means, index pin means provided on another part of said casing means, and power means to cause said hook means to pull said index pin means to a predetermined position at which said sealing edge is pressurized to a predetermined high degree of compression, and said openings are registered.

13. The invention as claimed in claim 12, in which said index pin means is adjacent said lock pin which said lock pin is inserted.

14. The invention as claimed in claim 11, in which reinforcing means are provided around said casing means to aid in withstanding the extremely high test pressure in said chamber, said reinforcing means having a multiplicity of overlapped portions associated with different parts of said casing means and through which said registered openings are provided.

15. The invention as claimed in claim 14, in which said reinforcing means include lock bars having some of said openings therethrough, said lock bars being pivotally mounted on said reinforcing means, and in which power means are provided to pivot said lock bars to predetermined positions at which said lock pin may be extended therethrough.

16. The invention as claimed in claim 11, in which said means recited in clause (d) comprise hook means provided on one part of said casing means, index pin means provided on another part of said casing means, and power means to cause said hook means to pull said index pin means to a predetermined position at which said sealing edge is pressurized to a predetermined extent and said openings are registered, in which reinforcing means are provided around said casing means to aid in withstanding the extremely high test pressure in said chamber, said reinforcing means having a multiplicity of overlapped portions associated with different parts of said casing means and through which said registered openings are provided, said reinforcing means including lock bars having some of said openings therethrough, said lock bars being pivotally mounted on said reinforcing means, and in which power means are provided to pivot said lock bars to predetermined closed positions at which said lock pin may be extended therethrough.

17. The invention as claimed in claim 16, in which means are associated with said hook means to determine the precise degree of closing of said casing means, and in which stop and index means are associated with said lock bars to determine the closed positions thereof, whereby to effect registry between said openings.

18. Apparatus for determining the presence or absence of a leak in a length of pipe, which apparatus comprises:
   a. first and second generally semicylindrical casing sections,
   b. hinge means to connect to each other one pair of opposed longitudinal edge regions of said casing sections,
      whereby said casing sections may pivot about said hinge means between an open position at which a length of pipe may be laterally introduced between said casing sections, and a closed position at which said casing sections enclose a space around at least part of said pipe length,
   c. lock bar means to connect to each other, when said casing sections are in said closed position, the other pair of opposed longitudinal edge regions of said casing sections,
      said lock bar means being connected to one of said longitudinal edge regions in said other pair, and being adapted to nest between elements secured to the other of said longitudinal edge regions in said other pair,
      said lock bar means having holes therein adapted to register, when said casing sections are in said closed position, with holes in said elements,
   d. means to effect substantially precise registry between said holes in said lock bar means and said holes in said elements when said casing sections are in said closed position,
   e. power-operated lock pin means to extend a lock pin longitudinally of said pipe length and through said registered holes, thus locking said casing sections in closed position,
   f. means adapted when said casing sections are in closed position to seal at least part of said space around said part of said pipe length, and define in said casing sections a sealed chamber one wall of which is said part of said pipe section,
   g. means independent of said pipe section to inject a test fluid into said sealed chamber, and to increase the pressure of said test fluid in said chamber until it is several thousands of psi, and
   h. means to detect a reduction in the pressure of said fluid in said test chamber, thus indicating a leak in said part of said pipe section.

19. The invention as claimed in claim 18, in which said hinge means recited in clause (b) includes ribs respectively secured to said first and second casing sections exteriorly thereof, further includes hinge bars extending across said one pair of opposed longitudinal edge regions of said casing sections and respectively nested between end portions of said ribs, further includes registered holes in said ribs at the ends of said hinge bars, and further includes hinge pins inserted through said registered holes, there being one hinge pin on each side of said one pair of opposed longitudinal edge regions.

20. The invention as claimed in claim 18, in which a plurality of strengthening ribs are respectively secured to said casing sections exteriorly thereof, in which said lock bar means recited in clause (c) comprise a plurality of bars nested between end portions of said ribs and extending across said other pair of opposed longitudinal edge regions of said casing sections, in which a pin is extended through registered holes in said ribs and said lock bars on one side of said other pair of opposed longitudinal edge regions, and in which said lock pin means recited in clause (e) is extended, when in locking condition, through registered holes in said lock bars and said ribs on the other side of said other pair of opposed longitudinal edge regions.

21. The invention as claimed in claim 18, in which said hinge means recited in clause (b) includes ribs respectively secured to said first and second casing sections exteriorly thereof, further includes hinge bars extending across said one pair of opposed longitudinal edge regions of said casing sections and respectively nested between end portions of said ribs, further includes registered holes in said ribs at the ends of said hinge bars, further includes hinge pins inserted through said registered holes, there being one hinge pin on each side of said one pair of opposed longitudinal edge regions, in which a plurality of strengthening ribs are respectively secured to said casing sections exteriorly thereof, in which said lock bar means recited in clause (c) comprise a plurality of bars nested between end portions of said ribs and extending across said other pair of opposed longitudinal edge regions of said casing sections, in which a pin is extended through registered holes in said ribs and said lock bars on one side of said other pair of opposed longitudinal edge regions, and in which said lock pin means recited in clause (e) is extended, when in locking condition, through registered holes in said lock bars and said ribs on the other side of said other pair of opposed longitudinal edge regions.

22. The invention as claimed in claim 20, in which power means are provided to pivot said lock bars about said pin, when said lock pin means is in a retracted position permitting opening of the casing sections, to a position making it relatively simple to effect lateral introduction of said length of pipe between said casing sections.

23. The invention as claimed in claim 22, in which stop means are provided to determine the closed positions of said lock bars, said stop means being such as to effect registry, in one direction of movement, of the holes in said lock bars with the holes in said ribs.

24. The invention as claimed in claim 23, in which power-operated hook means are provided to effect the last stages of closing of said casing sections, and in which adjustable means are associated with said hook means to effect precise registry, relative to a direction of movement perpendicular to said one direction of movement, of said holes in said lock bars relative to the holes in said ribs, said last-named means cooperating with said stop means recited in claim 23 to effect substantially precise registry of said holes whereby to facilitate insertion of said lock pin without binding.

25. The invention as claimed in claim 24, in which index bars are mounted at one of the two longitudinal edge regions in said one pair and said other pair of opposed longitudinal edge regions of said casing sections, in which grooves adapted to receive said bars are provided in the other edge of each of said pairs, said bars being adapted to be inserted into said grooves to provide an additional indexing function causing alignment of the holes in said lock bars with the holes in said ribs for insertion of said lock pin.

26. The invention as claimed in claim 25, in which said bars are beveled to facilitate insertion thereof into the associated grooves.

27. The invention as claimed in claim 25, in which said bars further serve as extrusion-prevention means for said seal means recited in clause (f).

28. Apparatus for testing for leaks a portion of a pipe length, said apparatus comprising:
  a. casing means having a plurality of sections adapted to be disposed adjacent each other around said pipe portion,
     one edge of each of said casing sections having provided thereon a protuberant bar adapted to overlap a region of the opposed edge of the adjacent casing section,
       whereby to aid in positioning said adjacent casing sections relative to each other and thus perform an indexing function,
  b. rubber seal means provided in association with said casing sections to seal the longitudinal joints between said opposed edges,
     said seal means being adjacent said bars whereby said bars serve additionally as extrusion-prevention means for said seal means,
  c. means to effect opening and closing of said casing sections,
     whereby said pipe portion may be introduced laterally into said casing sections when the casing sections are in open condition, and whereby a sealed chamber may be formed around said pipe portion when said casing sections are in closed condition,
  d. means to lock said casing sections in closed condition,
     said lock means including at least one lock pin extending longitudinally of said pipe portion through registered apertures and overlapped elements respectively associated with said casing sections,
  e. power means to move said lock pin longitudinally of said pipe portion between a closed position preventing opening of said casing sections and an open position permitting opening of said casing sections,
  f. means to inject test fluid into said chamber to increase the pressure of the test fluid in said chamber to a value of many thousands of psi, and
  g. means to sense a reduction in the pressure in said test chamber whereby to indicate a leak in the pipe portion being tested.

29. The invention as claimed in claim 28, in which means additional to said bars are provided to effect indexing between adjacent ones of said casing sections, thus increasing the degree of registry of said apertures whereby to facilitate insertion of said lock pin therethrough.

30. The invention as claimed in claim 29, in which said additional index means include hooks having shims therein, and further include stop means for movable ones of said overlapped elements, said movable ones being pivotally mounted on one of said casing sections.

* * * * *

UNITED STATES PATENT AND TRADEMARK OFFICE
CERTIFICATE OF CORRECTION

PATENT NO. : 3,975,945
DATED : August 24, 1976
INVENTOR(S) : Thomas D. Hauk; Kenneth J. Carstensen It is certified that error appears in the above-identified patent and that said Letters Patent are hereby corrected as shown below:

Col. 3, line 46: change "neckeddown" to ---necked-down---;

Col. 17, line 17: change "Fig. 2" to ---Fig. 2a---;

Col. 17, line 22: after "manipulation" insert ---of---;

Col. 20, line 31: change "which" to ---when---.

Signed and Sealed this

Ninth Day of November 1976

[SEAL]

Attest:

RUTH C. MASON
Attesting Officer

C. MARSHALL DANN
Commissioner of Patents and Trademarks